US007327466B2

(12) United States Patent
Carlson

(10) Patent No.: US 7,327,466 B2
(45) Date of Patent: Feb. 5, 2008

(54) MULTI-CORNER RETROREFLECTOR

(75) Inventor: Andrew Eric Carlson, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 259 days.

(21) Appl. No.: 10/980,976

(22) Filed: Nov. 3, 2004

(65) Prior Publication Data

US 2005/0094156 A1     May 5, 2005

Related U.S. Application Data

(60) Provisional application No. 60/517,325, filed on Nov. 3, 2003.

(51) Int. Cl.
*G01B 11/02* (2006.01)
*G02B 5/04* (2006.01)

(52) U.S. Cl. ..................................... 356/500; 359/836
(58) Field of Classification Search ............... 356/493, 356/498, 500; 359/529, 834, 836
See application file for complete search history.

(56) References Cited

U.S. PATENT DOCUMENTS

| | | | |
|---|---|---|---|
| 5,483,343 A | 1/1996 | Iwamoto et al. | |
| 5,801,832 A | 9/1998 | Van Den Brink | |
| 5,988,820 A * | 11/1999 | Huang et al. | ............... 359/530 |
| 6,198,574 B1 | 3/2001 | Hill | |
| 6,542,247 B2 * | 4/2003 | Bockman | ..................... 356/493 |
| 6,757,066 B2 | 6/2004 | Hill | |
| 6,778,280 B2 | 8/2004 | De Groot et al. | |
| 6,806,960 B2 * | 10/2004 | Bagwell et al. | ............. 356/487 |
| 2003/0218757 A1 | 11/2003 | Hill | |
| 2003/0223080 A1 | 12/2003 | Hill | |
| 2006/0001888 A1* | 1/2006 | HIll | ........................... 356/493 |
| 2006/0087657 A1 | 4/2006 | Holmes et al. | |

FOREIGN PATENT DOCUMENTS

GB    2 070 276 A    9/1981

OTHER PUBLICATIONS

Chien-Ming Wu, et al., "Analytical modeling of the periodic nonlinearity in heterodyne interferometry", *Applied Optics*, vol. 37, No. 28, pp. 6696-6700 (Oct. 1, 1998).
Mauer, Paul, "Phase Compensation of Total Internal Reflection", *Journal of the Optical Society of America*, vol. 56, No. 9, pp. 1219-1221 (Sep. 1966).
Lay, O.P. and Dubovitsky, S., "Polarization compensation: a passive approach to a reducing heterodyne interferometer nonlinearity," *Optics Letters* 27: 797-799 (May 15, 2002).
M.A. Player, "Polarization properties of a cube-corner reflector", *Journal of Modern Optics*, vol. 35, No. 11, pp. 1813-1820 (1988).
Pottiez, O. et al., "Easily tuneable nonlinear optical loop mirror including low-birefringence, highly twisted fibre with invariant output polarization," *Optics Communications* 229: 147-159 (2004).

* cited by examiner

*Primary Examiner*—Patrick Connolly
(74) *Attorney, Agent, or Firm*—Fish & Richardson P.C.

(57) ABSTRACT

A two-corner retroreflector that includes a common face positioned to receive two beams and two corners each positioned to receive one of the beams and retro-reflect it back through the common face.

73 Claims, 28 Drawing Sheets

MULTI-CORNER RETROREFLECTOR

CROSS-REFERENCE TO RELATED APPLICATIONS

This application claims priority under 35 USC §119(e) to Provisional Patent Application 60/517,325, filed on Nov. 3, 2003, entitled "Two-Corner Retroreflector," to Andrew E. Carlson, herein incorporated by reference in its entirety.

BACKGROUND

This description relates to retroreflectors, which are optical components that retro-reflect an input light beam to produce an output light beam propagating parallel to the input beam but in an opposite direction. An example of a retroreflector is a cube corner having three optical surfaces that intersect at right angles. Retroreflectors can be used in distance measuring interferometers. For example, they can be used in multi-axis interferometers of semiconductor lithography machines to derive an angle based on the difference of two parallel distance measurements having a known separation.

In a conventional multi-axis interferometer, individual retroreflectors are positioned and mounted to achieve the desired spatial separation of the measurement axes. This process can be difficult to perform in mass production in a way that is cost effective. The individual retroreflectors may be placed in position and fastened to a frame or optically attached to another component of the interferometer. The position may have some variation from the ideal position, and there can mechanical instability between retroreflectors. To position each retroreflector, some form of metrology feed back is required. In one example, the feedback is the location of the center of a beam of light. There is a level of uncertainty related to the center of a beam of light. This uncertainty can be greater than required. The final assembly may have inherent stability issues that can result in relative motion between retroreflectors.

SUMMARY

In one aspect, the invention features a multi-corner retroreflector that includes a common face positioned to receive two beams, the optical device further including two corners each positioned to receive one of the beams and retro-reflect it back through the common face.

Implementations of the invention may include one or more of the following features. The multi-corner retroreflector includes a reflecting face positioned to direct one of the beams from the common face to one of the corners. The reflecting face overlaps one of the faces of the other corner. The multi-corner retroreflector is formed by optically contacting two right-angle prisms, and a first one of the prisms includes the two corners. The two right-angle prisms are held together by an adhesive or by silicate bonding. The adhesive includes at least one of UV glue, an index matching epoxy, and an epoxy that is not index matched.

The multi-corner retroreflector is made of a single piece of material. The material includes glass. The distance between the apexes of the two corners is fixed. The first corner has two faces that overlap two faces of the second corner.

The multi-corner retroreflector includes a first piece of material including the first and second corners, and a second piece of material including the common face. The first and second pieces of materials contact each other. An index matching layer is disposed between the two pieces of materials.

Each corner has three faces, and at least one of the faces of the corners includes a polished surface or a silver coating. The common face includes an antireflection coating.

Each corner has three faces, and the first corner has a face that is parallel to a face of the second corner.

The common face is positioned to receive a third beam, and the multi-corner retroreflector includes a third corner positioned to receive the third beam and retro-reflect it back through the common face. Two of the three cube corners have apexes that are adjacent to each other. The three beams are parallel to one another.

The common face is positioned to receive a fourth beam, and the multi-corner retroreflector includes a fourth corner positioned to receive the fourth beam and retro-reflect it back through the common face. The multi-corner retroreflector includes a reflecting face positioned to direct a first one of the four beams from the common face to a first one of the corners, and to direct a second one of the four beams from the common face to a second one of the corners. The four beams are parallel to one another.

In another aspect, the invention features an interferometer that includes optics to generate a first measurement beam and a second measurement beam that each contacts a measurement object at least a first time and a second time, and overlap each of the measurement beams with a reference beam to generate an interfering signal. The interferometer further includes a multi-corner retroreflector described above to redirect each of the first and second measurement beams after the beam contacts the measurement object the first time and before the beam contacts the measurement object the second time.

In another aspect, the invention features a lithography system for use in fabricating integrated circuits on a wafer, the system including a stage for supporting the wafer, an illumination system for imaging spatially patterned radiation onto the wafer, a positioning system for adjusting the position of the stage relative to the imaged radiation, and a multi-axis interferometer for monitoring the position of the wafer relative to the imaged radiation. The multi-axis interferometer includes the multi-corner retroreflector described above to redirect light beams in the multi-axis interferometer.

In another aspect, the invention features a lithography system for use in fabricating integrated circuits on a wafer, the system including a stage for supporting the wafer, and an illumination system including a radiation source, a mask, a positioning system, a lens assembly, and a multi-axis interferometry system including the multi-corner retroreflector described above. During operation the source directs radiation through a mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask, the system including a source providing a write beam to pattern a substrate, a stage supporting the substrate, a beam directing assembly for delivering the write beam to the substrate, a positioning system for positioning the stage and beam directing assembly relative one another, and an interferometry system that includes the multi-corner retroreflector described above for monitoring the position of the stage relative to the beam directing assembly.

In another aspect, the invention features a multi-corner retroreflector that includes at least one face to receive at least two input beams, and at least two corners formed by a single piece of material, the corners each positioned to receive a beam and retro-reflect it back through the at least one face.

Implementations of the invention may include one or more of the following features. The multi-corner retroreflector receives three input beams and includes three corners each positioned to receive and retro-reflect one of the input beams. The three input beams are substantially parallel to one another. The multi-corner retroreflector includes a one-corner retroreflector that includes one of the three corners and a two-corner retroreflector that includes two of the three corners.

The multi-corner retroreflector receives four input beams and includes four corners each positioned to receive and retro-reflect one of the input beams. The four input beams are substantially parallel to one another. The multi-corner retroreflector includes two two-corner retroreflectors each including two of the four corners.

In another aspect, the invention features a multi-axis interferometer for measuring a relative position of a reflective measurement object along multiple degrees of freedom, the interferometer having optics to produce multiple output beams each including information about the position of the measurement object relative to a reference object with respect to a different one of the degrees of freedom, the optics including a multi-corner retroreflector that includes two different retroreflectors that share one or more common reflecting surface.

Implementations of the invention may include one or more of the following features. Each output beam includes a measurement beam component that contacts the measurement object at least once along a path that is common to at least two output beams. At least one of the measurement beam components further contacts the measurement object at least a second time along another path different from the common path. The optics includes a polarizing beam-splitter positioned to direct the measurement beam components to contact the measurement object along the common path. The optics includes a return beam assembly configured to receive the primary measurement beam from the polarizing beam-splitter and direct the multiple beams back to the polarizing beam-splitter using the two retroreflectors. The retroreflectors includes corner cube retroreflectors. The corner cube retroreflectors are formed by a single unit of material.

In another aspect, the invention features an interferometry system that includes a multi-corner retroreflector, which includes a common face to receive two beams that are substantially parallel to each other and spaced apart at a specified distance, and two corners each positioned to receive one of the beams and retro-reflect it back through the common face, in which the distance between the apexes of the two corners as projected on the common face is substantially equal to the specified distance.

Implementations of the invention may include one or more of the following features. The interferometry system includes a beam splitter to receive an incident beam and generate the first and second beams. The two corners include polished surfaces of a single piece of material.

In another aspect, the invention features an interferometer that includes a multi-corner retroreflector described above, and optics to overlap each of the two beams that are retro-reflected by the two corners with a reference beam to generate interfering signals.

In another aspect, the invention features a method that includes optically contacting a hypotenuse of a first right-angle prism to a leg of a second right-angle prism to form a two-corner retroreflector.

Implementations of the invention may include one or more of the following features. The method includes holding the two right-angle prisms together by an adhesive or by silicate bonding. The adhesive includes at least one of UV glue, an index matching epoxy, and an epoxy that is not index matched. The method includes applying a coating on a face of the right-angle prism. The method includes attaching the two-corner retroreflector to a set of optical components that include a beam splitter to form an interferometer.

In another aspect, the invention features a method that includes retro-reflecting a first beam and a second beam using two corners of a single piece of material.

Implementations of the invention may include one or more of the following features. The corners include polished surfaces of the material. The method includes receiving the first and second beams at a common face, propagating the first beam from the common face to a first one of the corners, and reflecting the second beam from the common face to a second one of the corners. The method includes overlapping each of the first and second light beams with a reference beam to generate interfering signals. The method includes determining a change in position and/or orientation of a measurement object relative to a reference object based on the interfering signals.

In another aspect, the invention features a method that includes retro-reflecting a first beam using a first corner, and retro-reflecting a second beam using a second corner. The first and second beams are spaced apart at a specified distance, the apexes of the first and second corners pointing to different directions and being spaced apart at the fixed distance.

Implementations of the invention may include one or more of the following features. The first corner has two faces that overlap two faces of the second corner. The method includes overlapping each of the first and second beams with a reference beam to generate interfering signals. The method includes determining a change in position and/or orientation of a measurement object relative to a reference object based on the interfering signals.

In another aspect, the invention features a method that includes receiving at least two beams at one or more faces of an optical device having at least two corners formed by a single piece of material, the corners each positioned to receive one of the beams and retro-reflect it back through the at least one face.

Implementations of the invention may include one or more of the following features. Receiving at least two beams includes receiving at least three beams at one or more faces of an optical device having at least three corners. Receiving at least two beams includes receiving at least four beams at one or more faces of an optical device having at least four corners.

In another aspect, the invention features a method that includes interferometrically producing at least two output beams each comprising information about a position of a portion of a measurement object relative to a reference object, in which each output beam includes a beam component that contacts the measurement object at least one time along a common path, and at least one of the beam components further contacts the measurement object at least a second time along a first path different from the common path, in which producing the output beams comprising redirecting the beam components by retro-reflecting a first beam component using a first corner, and retro-reflecting a second beam component using a second corner, in which the first and second beam components are spaced apart at a specified distance, the apexes of the first and second corners pointing to different directions and being spaced apart at the fixed distance.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Other features, objects, and advantages of the invention will be apparent from the following detailed description.

DESCRIPTION OF DRAWINGS

Like reference symbols in the various drawings indicate like elements.

DETAILED DESCRIPTION

Figure 1:
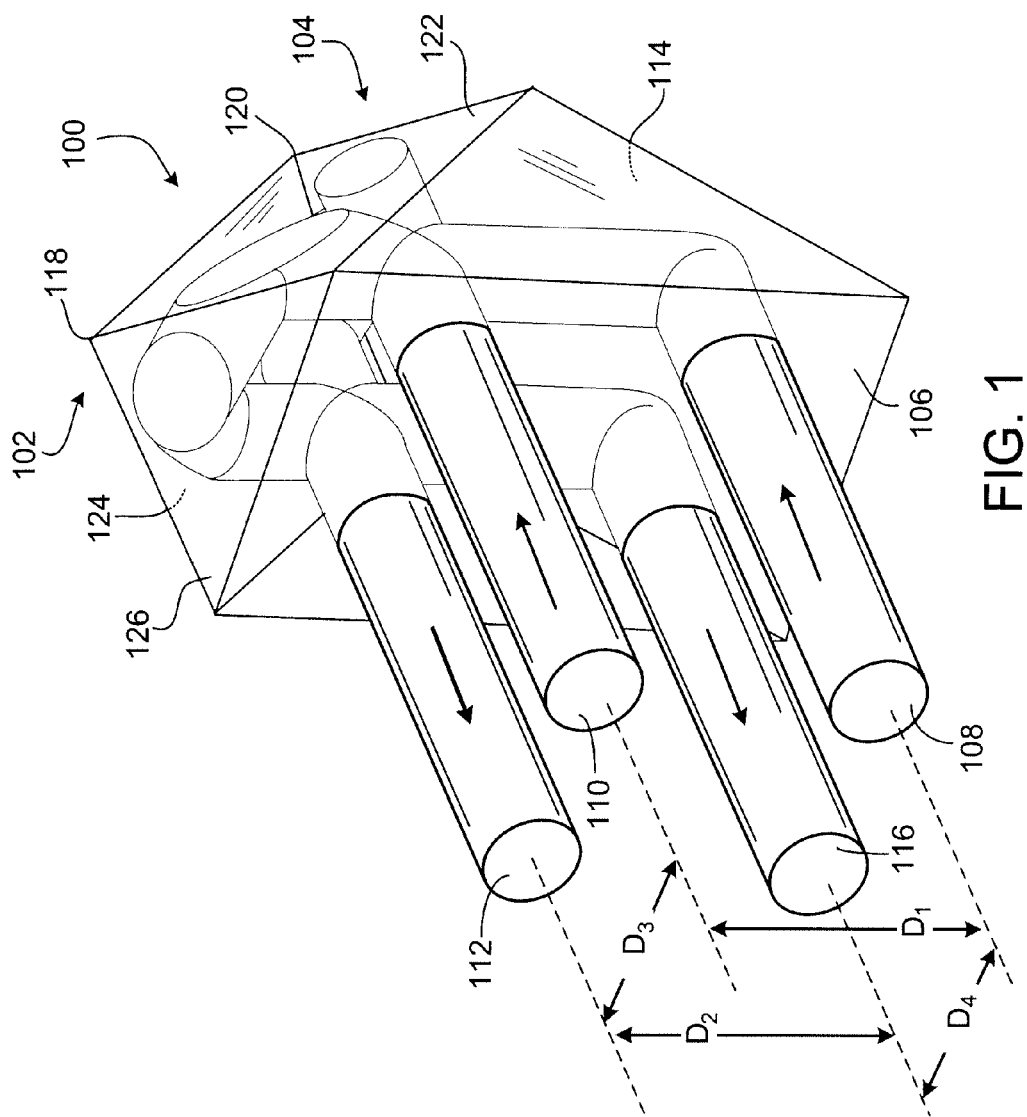
FIG. 1 shows two input light beams retro-reflected by a two-corner retroreflector.

Referring to FIG. 1, a two-corner retroreflector 100 includes an upper cube corner 102 that retro-reflects a lower input beam 108, and a lower cube corner 104 that retro-reflects an upper input beam 110. The two-corner retroreflector 100 includes a common face 106 to receive the beams 108 and 110. Each of the cube corners 102 and 104 is formed by three faces that intersect at right angles. The cube corners 102 and 104 act as individual retroreflectors having different orientations. The upper input beam 110, after passing the common face 106, is retro-reflected by the lower cube corner 104 to generate an upper output beam 112, which propagates parallel to the beam 110. A reflecting face 114 acts as an internal fold mirror to direct the lower input beam 108 to the upper cube corner 102, and to direct the retro-reflected beam toward the common face 106 to generate a lower output beam 116, which propagates parallel to the beam 108.

In one example, the two cube corners 102 and 104 are fabricated from a single piece of glass and share two faces 122 and 124. The two cube corners 102 and 104 have opposing faces 126 and 114 that are parallel to each other. The faces of the cube corners 102 and 104 can be precisely cut and polished so that the distance between apexes 118 and 120 (of cube corners 102 and 104, respectively) is equal to a specified value. Because the distance between the apexes 118 and 120 and the orientations of the cube corners 102 and 104 relative to each other are fixed, the two cube corners 102 and 104 can be conveniently integrated with other components of an optical system. When the position and orientation of the two-corner retroreflector 100 are adjusted, the positions and orientations of both cube corners 102 and 104 are adjusted at the same time.

A feature of the two-corner retroreflector 100 is that five optical surfaces are used. Four optical surfaces are used to form the two cube corners 102 and 104, and one optical surface acts as the common face 106. By comparison, two independently fabricated corner cube retroreflectors require six optical surfaces (three surfaces for each retroreflector). Each optical surface requires precise treatment to have the desired optical properties, thus, reducing the number of optical surfaces results in reduced fabrication costs.

Figure 11A:
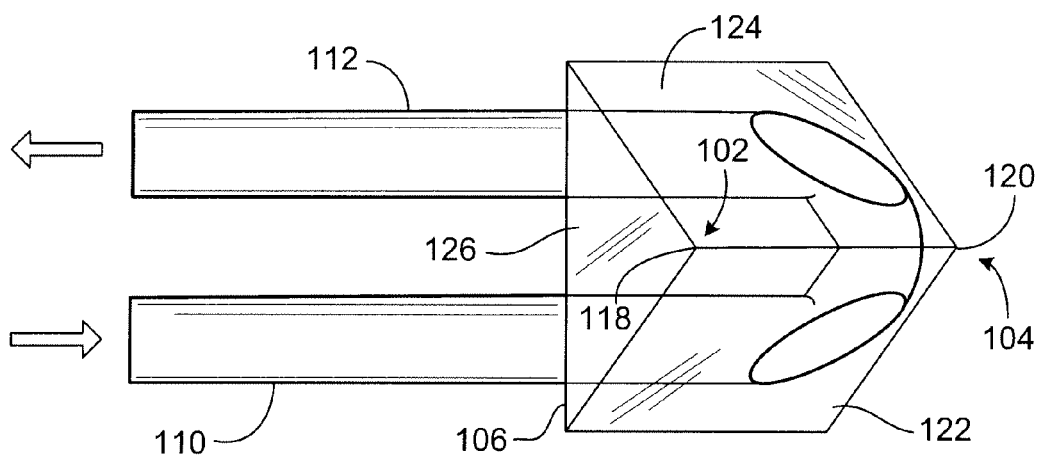
FIGS. 11A and 11B show a top view and a side view, respectively, of an upper input beam being retro-reflected by a lower cube corner of the two-corner retroreflector.
Figure 11B:
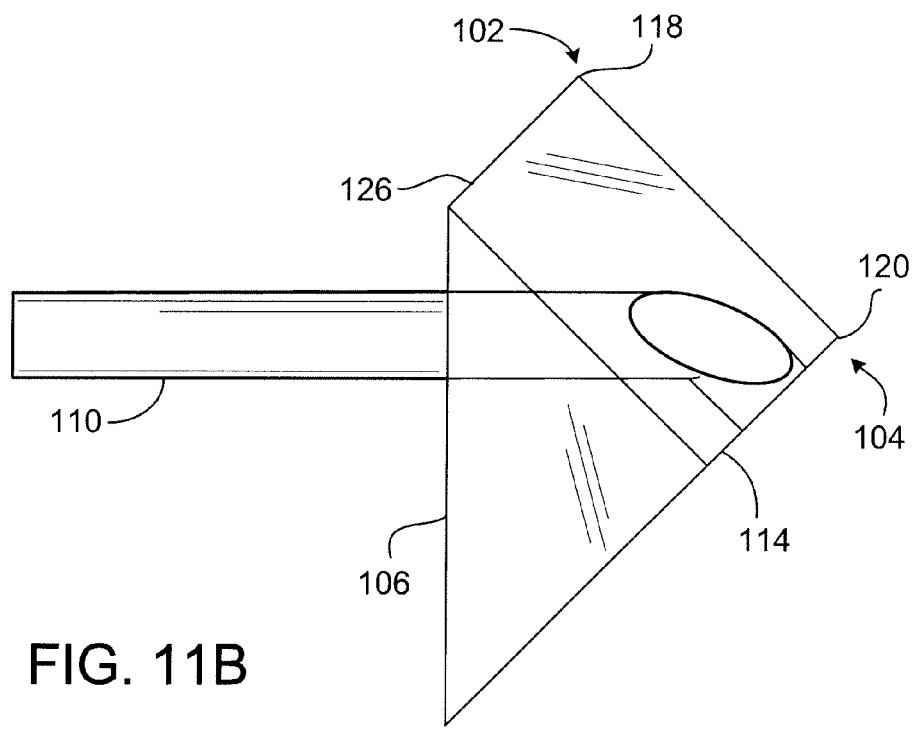

FIGS. 11A and 11B show a top view and a side view, respectively, of the upper input beam 110 being retro-reflected by the lower cube corner 104. The upper input beam 110, after passing the common face 106, propagates towards the lower cube corner 104. At the lower cube corner 104, the upper input beam 110 is redirected by the faces 122, 114, and 124 in sequence. The retro-reflected beam passes the common face 106 again and becomes the upper output beam 112.

Figure 12A:
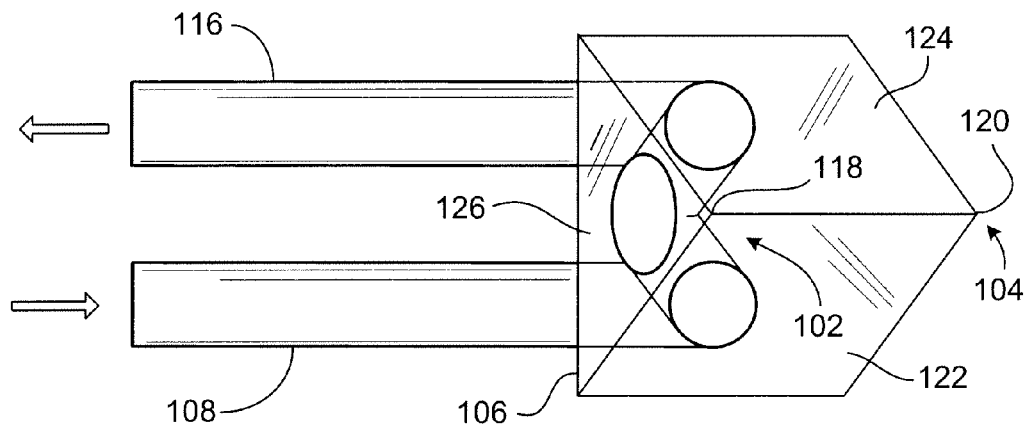
FIGS. 12A and 12B show a top view and a side view, respectively, of a lower input beam being retro-reflected by an upper cube corner of the two-corner retroreflector.
Figure 12B:
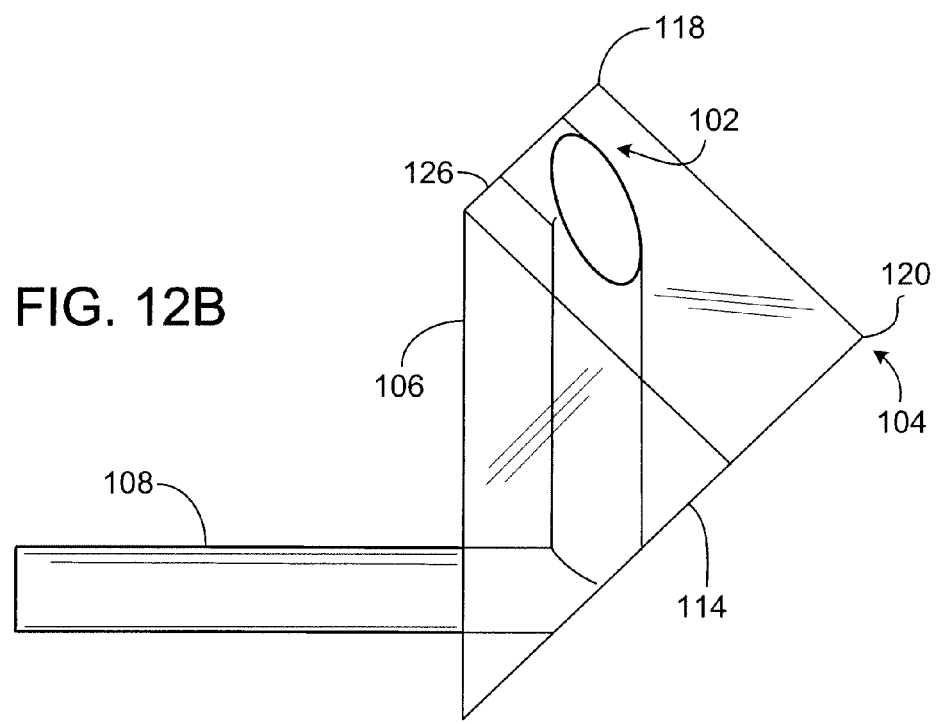

FIGS. 12A and 12B show a top view and a side view, respectively, of the lower input beam 108 being retro-reflected by the upper cube corner 102. The lower input beam 108, after passing the common face 106, is redirected by the reflecting face 114 towards the upper cube corner 102. At the upper cube corner 102, the lower input beam 108 is redirected by the faces 122, 126, and 124 in sequence. The retro-reflected beam is redirected by the reflecting face 114 and passes the common face 106 again, and becomes the lower output beam 116.

Figure 2:
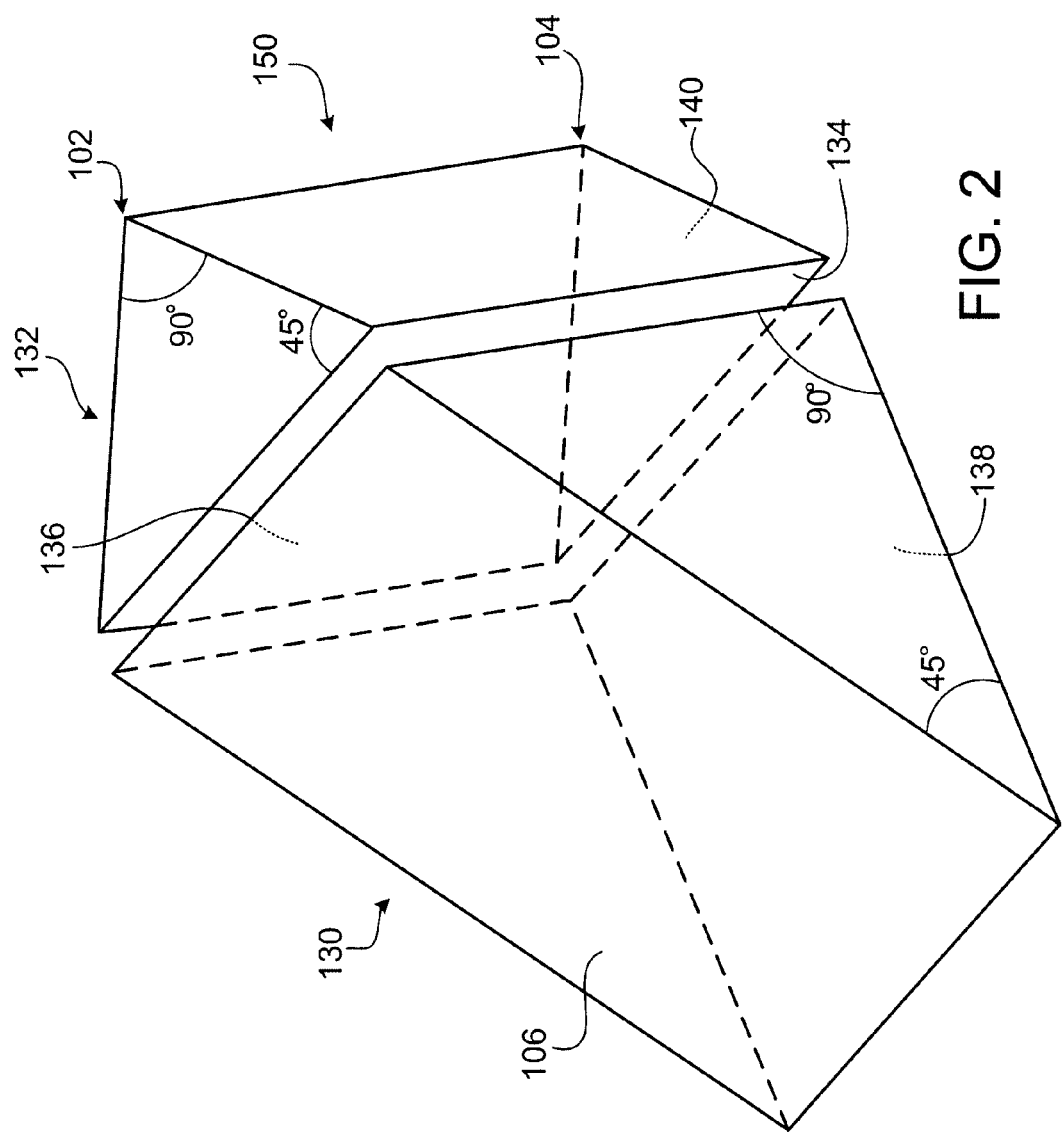
FIG. 2 shows a two-corner retroreflector formed by two right angle prisms.

FIG. 2 shows an exploded view of an example of a two-corner retroreflector 150 that is formed by combining two right angle prisms 130 and 132. Each prism has a hypotenuse face that is at a 45° angle relative to each of two legs of the prism. A hypotenuse face 134 of the prism 132 optically contacts a leg 136 of the prism 130. The hypotenuse face 134 can be bonded to the leg 136 by using an adhesive, such as UV glue, an index matching epoxy, or an epoxy that is not index matched. Silicate bonding can also be used to bond the two prisms together.

A hypotenuse face 106 of the prism 130 acts as a common face of the two-corner retroreflector 150. The two cube corners 102 and 104 of the prism 132 form the two cube corners of the two-corner retroreflector 150. A leg 138 of the prism 130 forms the reflecting face that redirects an input beam towards the cube corner 102.

Figure 3:
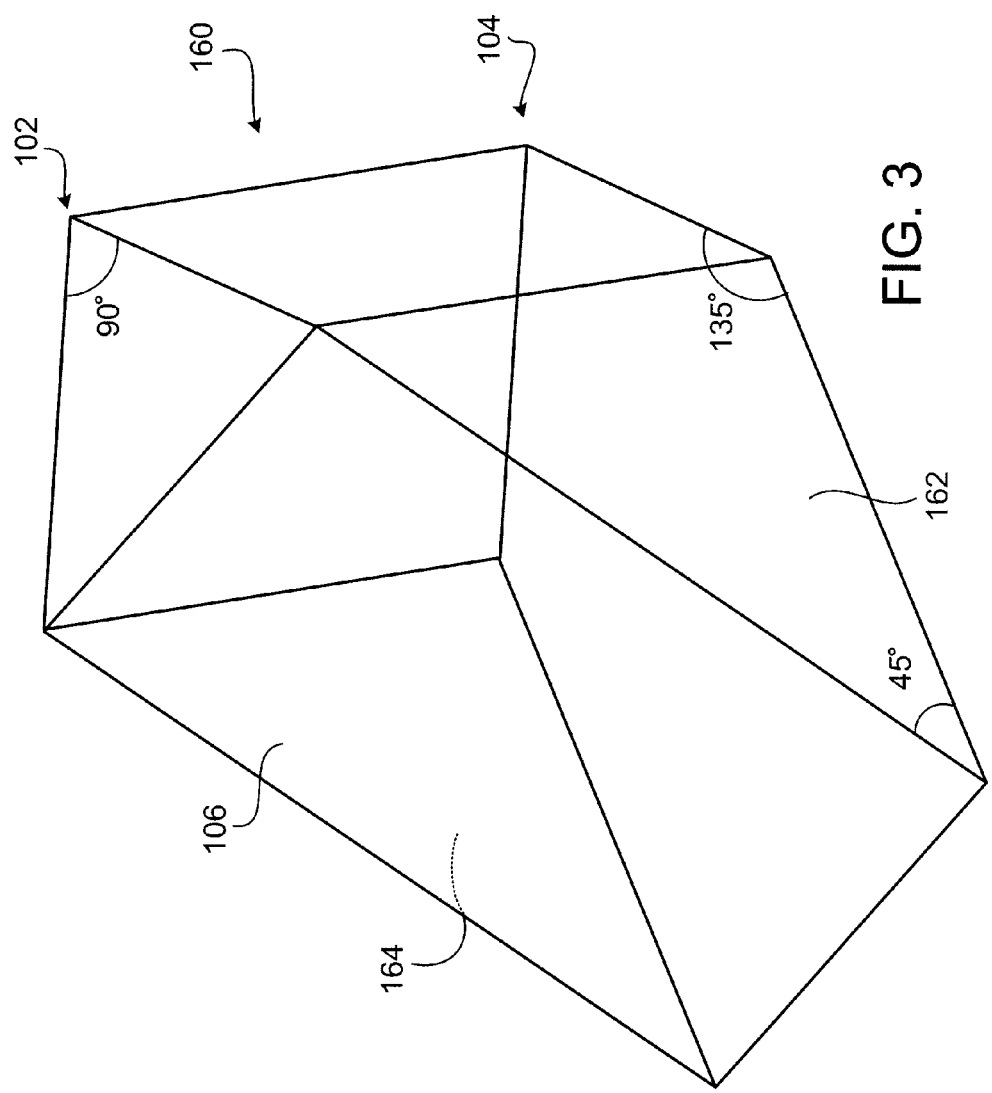
FIGS. 3 and 4 each shows a two-corner retroreflector formed by a single piece of glass.

FIG. 3 shows an example in which a two-corner retroreflector 160 is fabricated from a single piece of glass. The overall three dimensional shape of the two-corner retroreflector 160 is the same as that of the retroreflector 150 of FIG. 2. The retroreflector 160 has faces 162 and 164 (in the shape of a right angle triangle) that are parallel to each other, and each forms a 135° angle with a face that is common to the two cube corners 102 and 104.

An advantage of the two-corner retroreflector 150 is that it can be made from right angle prisms, which are standard off-the shelf components. An advantage of the two-corner retroreflector 160 is that its construction is more rigid, and there are no internal interfaces that may cause internal reflections.

Figure 4:
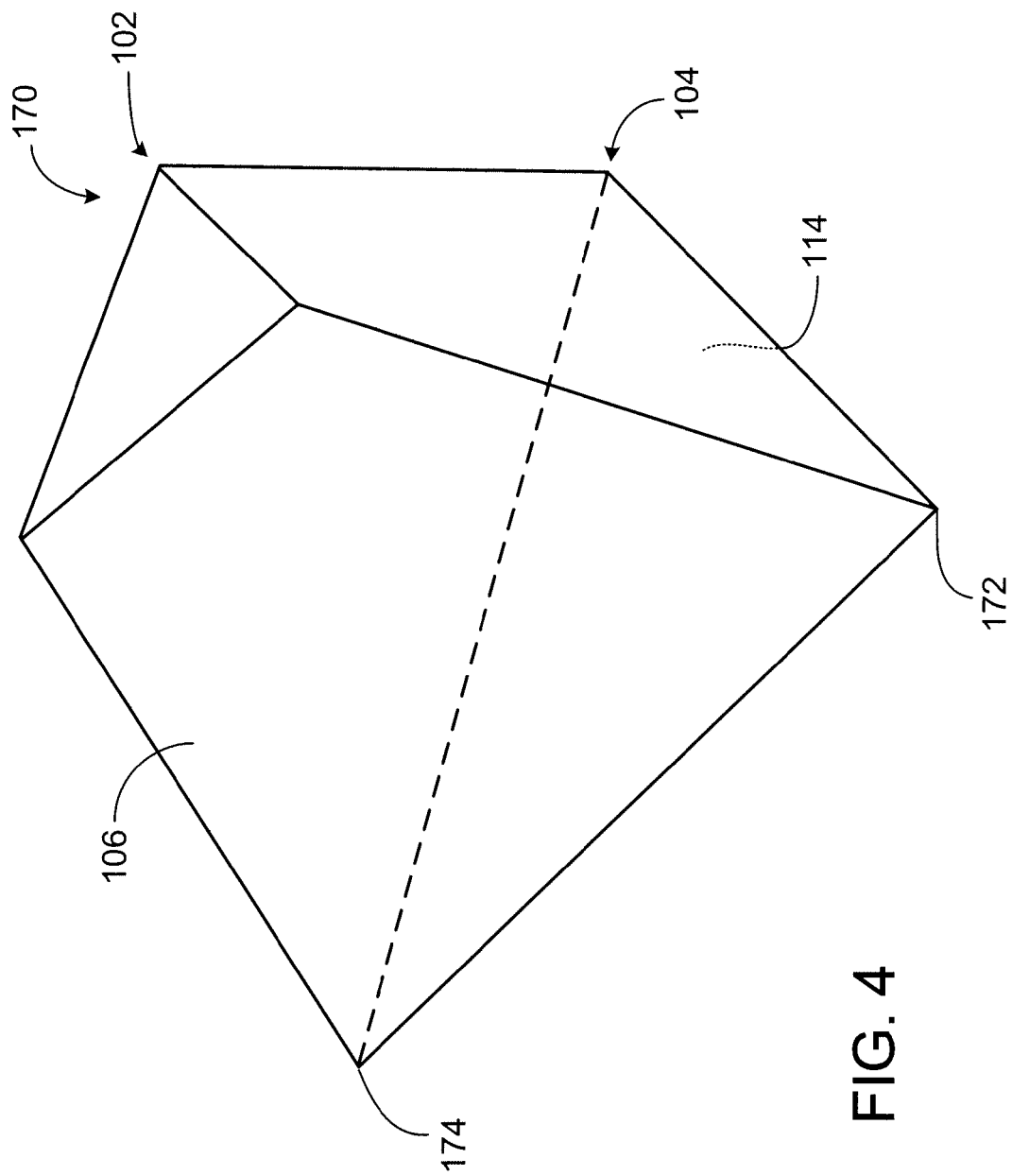

FIG. 4 shows another example in which a two-corner retroreflector 170 is fabricated from a single piece of glass. The retroreflector 170 has a common face 106 that receives incoming light beams that are retro-reflected by cube corners 102 and 104. One of the light beams propagates towards the cube corner 104 after passing the common face 106. Another of the light beams, after passing the common face 106, is redirected by a reflecting face 114 towards the cube corner 102. The retroreflector 170 has five faces, whereas the retroreflector 160 has seven faces. The retroreflector 160 uses less glass than the retroreflector 170. The retroreflector 160 can be formed by cutting away material near two corners 172 and 174 of the retroreflector 170 to generate the faces 162 and 164 (FIG. 3).

Figure 5:
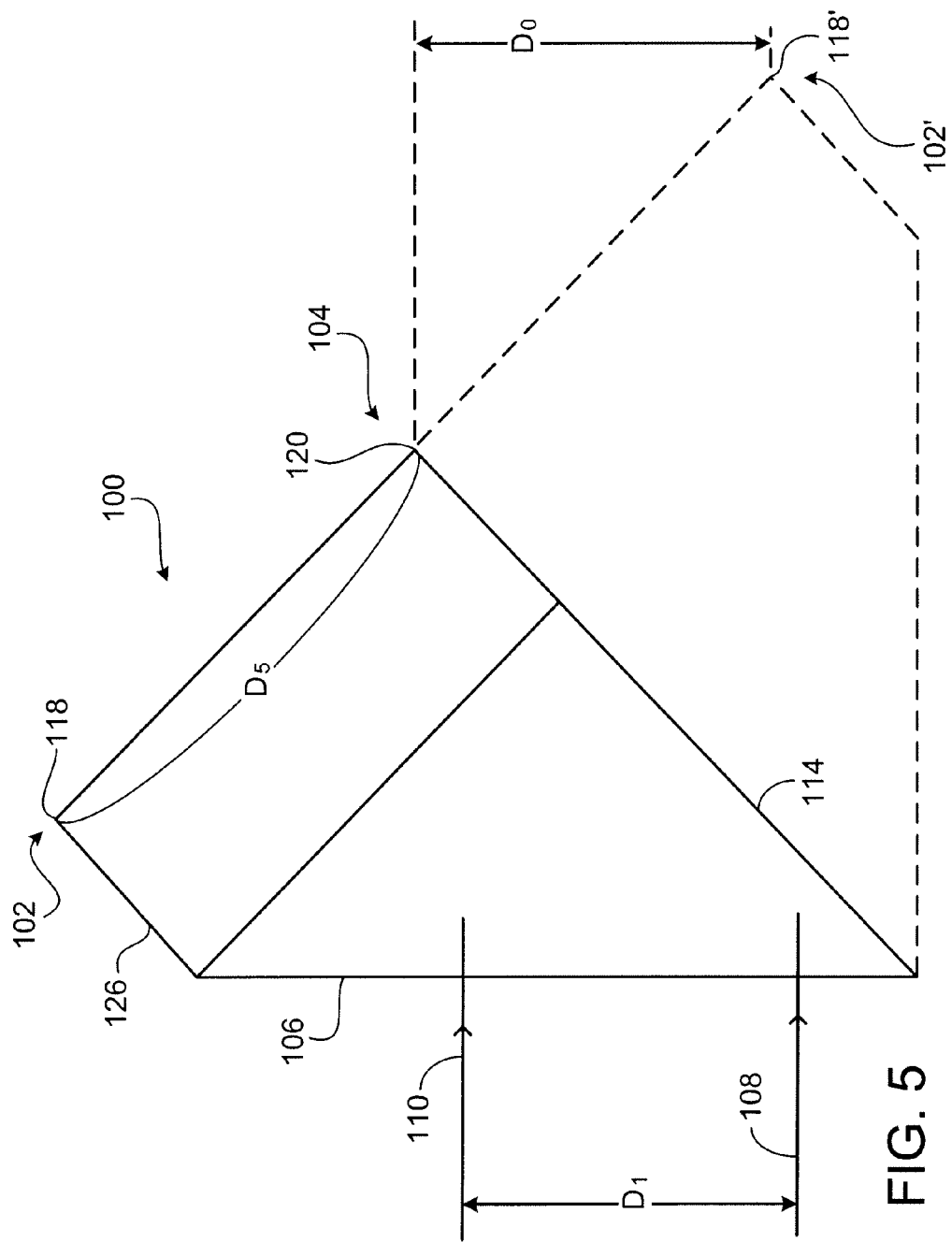
FIG. 5 shows a side view of a two-corner retroreflector and a mirror image of one of the cube corners.

FIG. 5 shows a side view of the two-corner retroreflector 100. The distance between the apexes 118 and 120 is D5. The cube corner 102 can be seen from the common face 106 as a reflected image from the reflecting face 114. A cube corner 102' (shown in dashed lines) represents a mirror image of the cube corner 102. The distance D0 between the apex 120 and an apex 118' of the cube corner 102' is such that $D0=D5/\sqrt{2}$, in which D0 is measured along a direction parallel to the common face 106. D0 represents the distance between the apexes 118 and 120 as seen from the common face 106.

In one example, the two-corner retroreflector 100 is used in a multi-axis interferometer, in which the light beams 108, 110, 112, and 116 (only beams 108 and 110 are shown in the figure) are measurement beams that contact different regions of a measurement object. The incoming light beams 108 and 110 are parallel to each other and propagate along directions perpendicular to the common face 106. The light beams 108 and 110 are spaced apart by a distance D1, in which the distance between the light beams refers to the distance between the center axes of the light beams. The two-corner retroreflector 100 is fabricated so that $D5=D1\times\sqrt{2}$, and thus, D0=D1. When D0=D1, the distance D2 (see FIG. 1) between the return light beams 116 and 112 will be equal to D1, and the distance D3 between the light beams 110 and 112 will be equal to the distance D4 between the light beams 108 and 116.

The multi-axis interferometer is configured so that each of the measurement beams 108, 110, 112, and 116 is overlapped with a reference beam to generate an interfering signal. By detecting changes in the interfering signals, changes in the positions of the different regions of the measurement object contacted by the measurement beams can be determined. Combining information about changes in the positions of the different regions of the measurement object provides information about changes in orientation (or tilt angles) of the measurement object along different degrees of freedom. By having D1=D2 and D3=D4, it is easier to measure the tilt angles of the measurement object along different degrees of freedom using the detected changes in the interfering signals.

An advantage of using the two-corner retroreflector 100 (or 150, 160, 170, and 180, described below) is that the distance between the apexes of the two cube corners can be precisely defined when the retroreflector is fabricated, and the distance will not change when the retroreflector is mounted to other components of the optical system.

When two right angle prisms are used to construct the two-corner retroreflector, the sizes of the right angle prisms may be adapted to fulfill a wide range of interferometer configurations.

Figure 6:
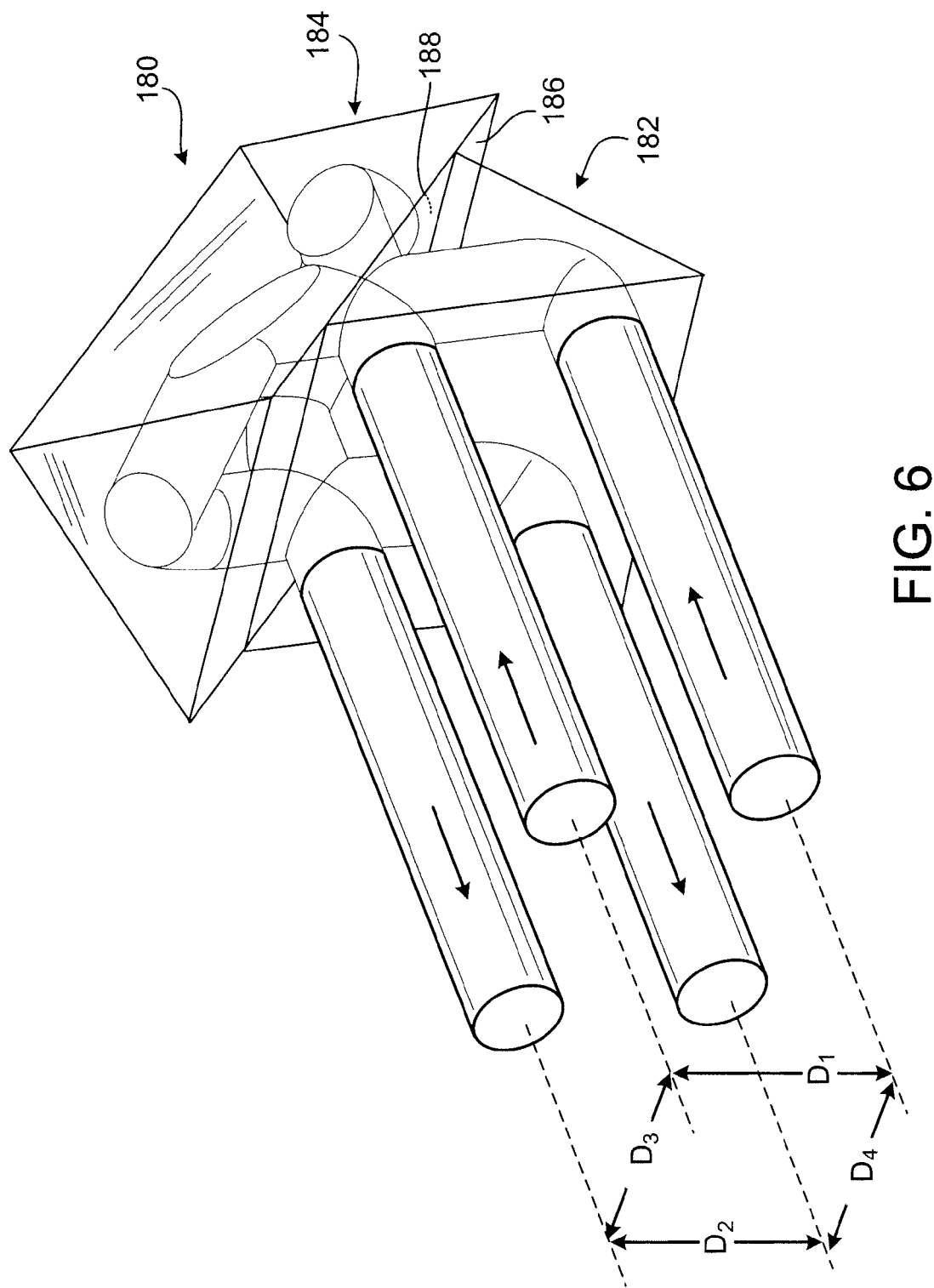
FIG. 6 shows a two-corner retroreflector.

FIG. 6 shows an example of a two-corner retroreflector 180 formed by optically contacting two right angle prisms 182 and 184, in which a hypotenuse face of the prism 184 contacts a leg of the prism 182. The prisms 182 and 184 are configured so that the area of the hypotenuse face 186 of prism 184 is larger than the area of the leg 188 of prism 182. This configuration provides a greater width (e.g., D3 and D4) between the lower input and output beams (and between the upper input and output beams), while maintaining a short vertical spacing (e.g., D1 and D2) between the two input beams (and between the two output beams).

The two-corner retroreflector 180 can also be constructed by cutting and polishing a single piece of glass into the shape of the combination of the prisms 182 and 184.

Figure 7:
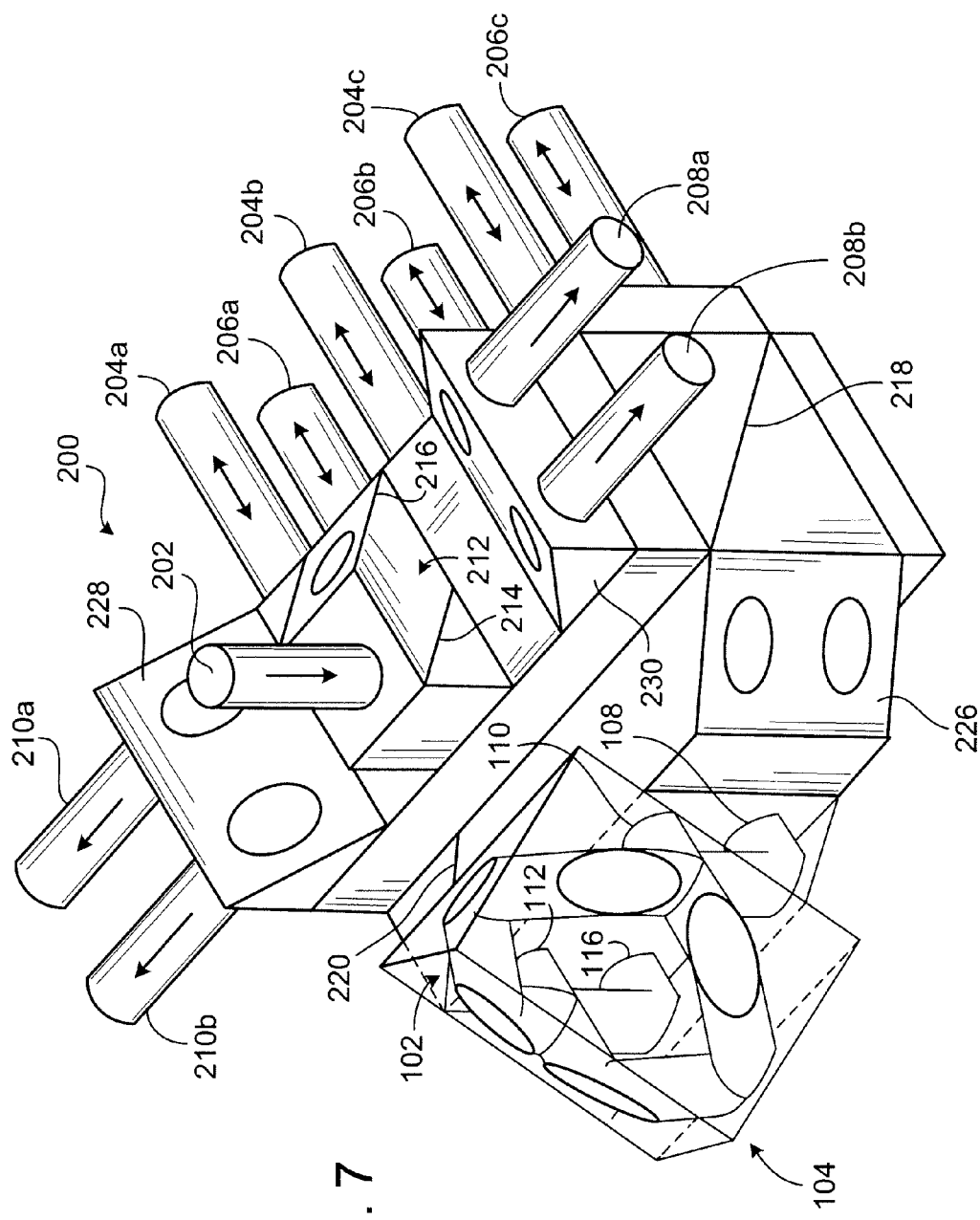
FIG. 7 shows an interferometer including the two-corner retroreflector of FIG. 6.

The two-corner retroreflector 100 (or 160, 170, 180) is useful in a multi-axis distance measuring interferometer. FIG. 7 shows an example of an interferometer 200 that uses the two-corner retroreflector 180 of FIG. 6. The interferometer 200 is of the type described in a commonly-owned U.S. Pat. No. 6,757,066, filed Jan. 27, 2003, and entitled "Multiple Degree of Freedom Interferometer" by Henry A. Hill, the contents of which are incorporated herein by reference. For example, each of the interferometers shown in FIGS. 4A, 5A, and 11 of U.S. Pat. No. 6,757,066 may use the two-corner retroreflector 100 (or 150, 160, 170, 180) instead of two independent retroreflectors.

Referring to FIG. 7, the interferometer 200 receives an input beam 202 from the top, and generates two sets of three measurements beams (204a, 204b, 204c, and 206a, 206b, 206c) that are directed to a measurement object (e.g., a stage mirror) to the right (not shown). The two-corner retroreflector 180 is positioned on the left of the interferometer 200, and is used to redirect each of the middle measurement beams (204b and 206b) upon its return from the measurement object. In this configuration, each of middle measurement beams is a common beam that is subsequently split into the two additional measurement beams for a second pass to the measurement object to define two separate measurement axes. Based on the measurement beams, two sets of two output beams (208a, 208b, and 210a, 210b) emerge from opposite sides of the interferometer 200. The output beams contain information about the position of the measurement object relative to a reference object with respect to different degrees of freedom.

Note that the terms "top," "right," and "left" as used herein refer to the directions shown in the figure. In actual use, the interferometer 200 may be oriented arbitrarily depending on the requirements of the optical system.

The following describes how the output beams 208a, 208b, 210a, and 210b are derived from the input beam 202.

The input beam 202 is separated into two beams by a rhomb 212 formed by a non-polarizing beam-splitting interface 214 and a reflecting face 216. Each of the two beams from the rhomb 212 is split into a measurement beam and a reference beam by a polarizing beam splitting interface 218. The measurement beams are directed toward the measurement object to the right, and become the beams 204b and 206b. The measurement beam 204b, after contacting the measurement object, combines with a corresponding reference beam to form an upper input beam 110 to the two-corner retroreflector 180. The measurement beam 206b, after contacting the measurement object, combines with a corresponding reference beam to form a lower input beam 108 to the two-corner retroreflector 180.

Note that quarter-wave plates are used in the interferometer 200 to change the polarizations of the beams. The operations of the quarter-wave plates are conventional and not described in detail here.

The upper input beam 110 is retro-reflected by the lower cube corner 104 to generate the upper output beam 112. The lower input beam 108 is retro-reflected by the upper cube corner 102 to generate the lower output beam 116. The upper output beam 112 is separated into a first beam and a second beam by a beam splitting interface 220.

The first beam derived from the upper output beam 112 passes the interface 220 and has a component that becomes the measurement beam 204a. The measurement beam 204a, after contacting the measurement object, combines with a corresponding reference beam, is redirected upwards by the beam splitting interface 218 and redirected by a fold mirror 228 to form the output beam 210b. The second beam derived from the upper output beam 112 is redirected by the interface 220, redirected by a reflecting face 226, and has a component that becomes the measurement beam 204c. The measurement beam 204c, after contacting the measurement object, combines with a corresponding reference beam, is redirected upwards by the beam splitting interface 218 and redirected by a fold mirror 230 to form the output beam 208b.

The lower output beam 116 is also separated into a first beam and a second beam by the beam splitting interface 220. The first beam derived from the lower output beam 116 passes the interface 220, and has a component that becomes the measurement beam 206a. The measurement beam 206a, after contacting the measurement object, combines with a corresponding reference beam, is redirected upwards by the beam splitting interface 218 and redirected by the fold mirror 228 to form the output beam 210a. The second beam derived from the lower output beam 116 is redirected by the interface 220 and the reflecting face 226, and has a component that becomes the measurement beam 206c. The measurement beam 206c, after contacting the measurement object, combines with a corresponding reference beam, is redirected upwards by the beam splitting interface 218 and redirected by the fold mirror 230 to form the output beam 208a.

In the interferometer 200 described above, the reference beams may contact a plane mirror reference object that is, for example, integrated into the interferometer assembly. Alternatively, the plane mirror reference object may be part of a second measurement object, such as in a differential plane mirror interferometer. In such examples, the interferometer 200 may include additional optics for coupling beams to the reference mirror on the second measurement object.

Figure 10:
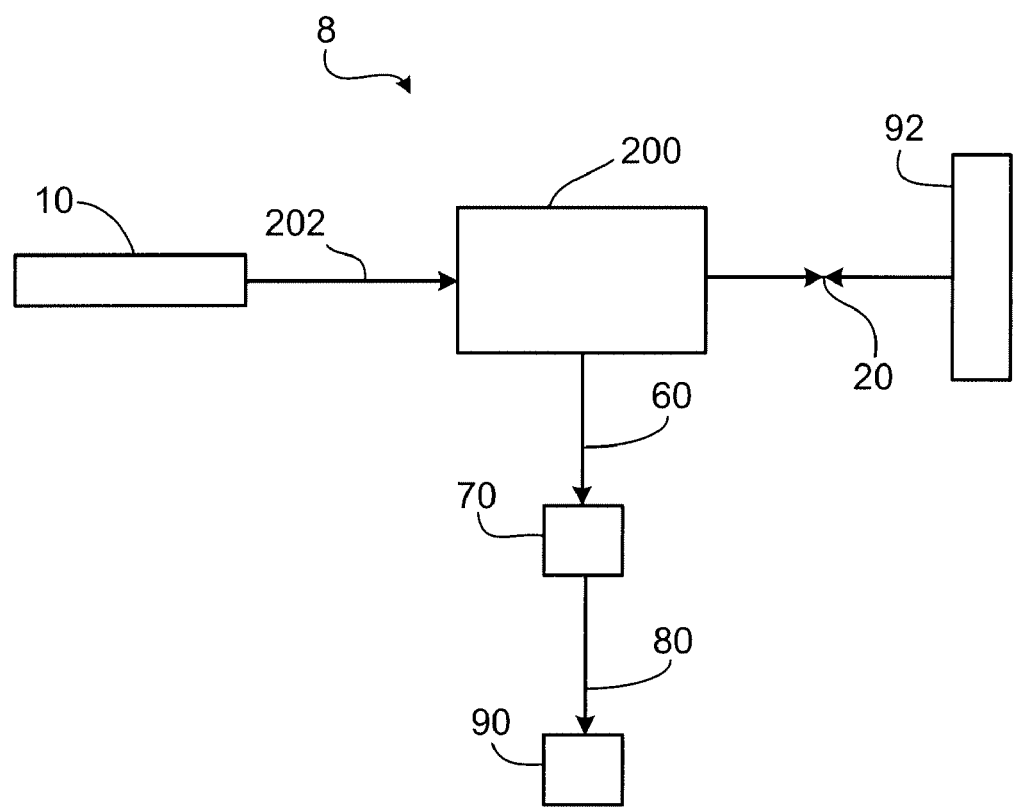
FIG. 10 is a schematic diagram of an interferometry system.

The interferometer 200 can be used in an interferometry system 8 shown in FIG. 10, in which linear and angular displacements of a plane mirror measurement object 92 are measured and monitored. The interferometer system 9 includes a source 10, an interferometer 200, a detector 70, and an electronic processor and computer 90 programmed in a well-known manner to perform data processing. Interferometer beams travel to and from the mirror 92 generally along an optical path designated as 20, and output beams travel from the interferometer 200 to the detector 70 along an optical path designated as 60. The output beams are detected by the detector 70 to generate electrical interference signals that are transmitted to the electronic processor and computer 90 as a signal 80. Typically, a polarizer or polarization "analyzer" (not shown) is used to mix the polarizations of the measurement and reference beam components of the output beam prior to its detection by the detector 70. In some examples, a fiber-optic pick-up (not shown) is used to couple the polarization-mixed output beam to a remote detector.

An input beam 202 is furnished by the source 10 and is a two-component beam. The two components have different frequencies and are orthogonally plane polarized. The different frequencies can be produced in source 10, for example, by laser Zeeman splitting, by acousto-optical modulation, or internal to the laser using birefringent elements or the like.

The interferometry system 8 provides highly accurate measurements and are especially useful in lithography applications used in fabricating large scale integrated circuits, for example, computer chips. Lithography is a key technology driver for the semiconductor manufacturing industry. Overlay improvement is one of the five most difficult challenges down to and below 100 nm line widths (design rules), as mentioned in the *Semiconductor Industry Roadmap*, p82 (1997).

Overlay depends directly on the performance, i.e., accuracy and precision, of the distance measuring interferometers used to position a wafer and reticle (or mask) stages. Since a lithography tool may produce $50-100M/year of products, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 8A:
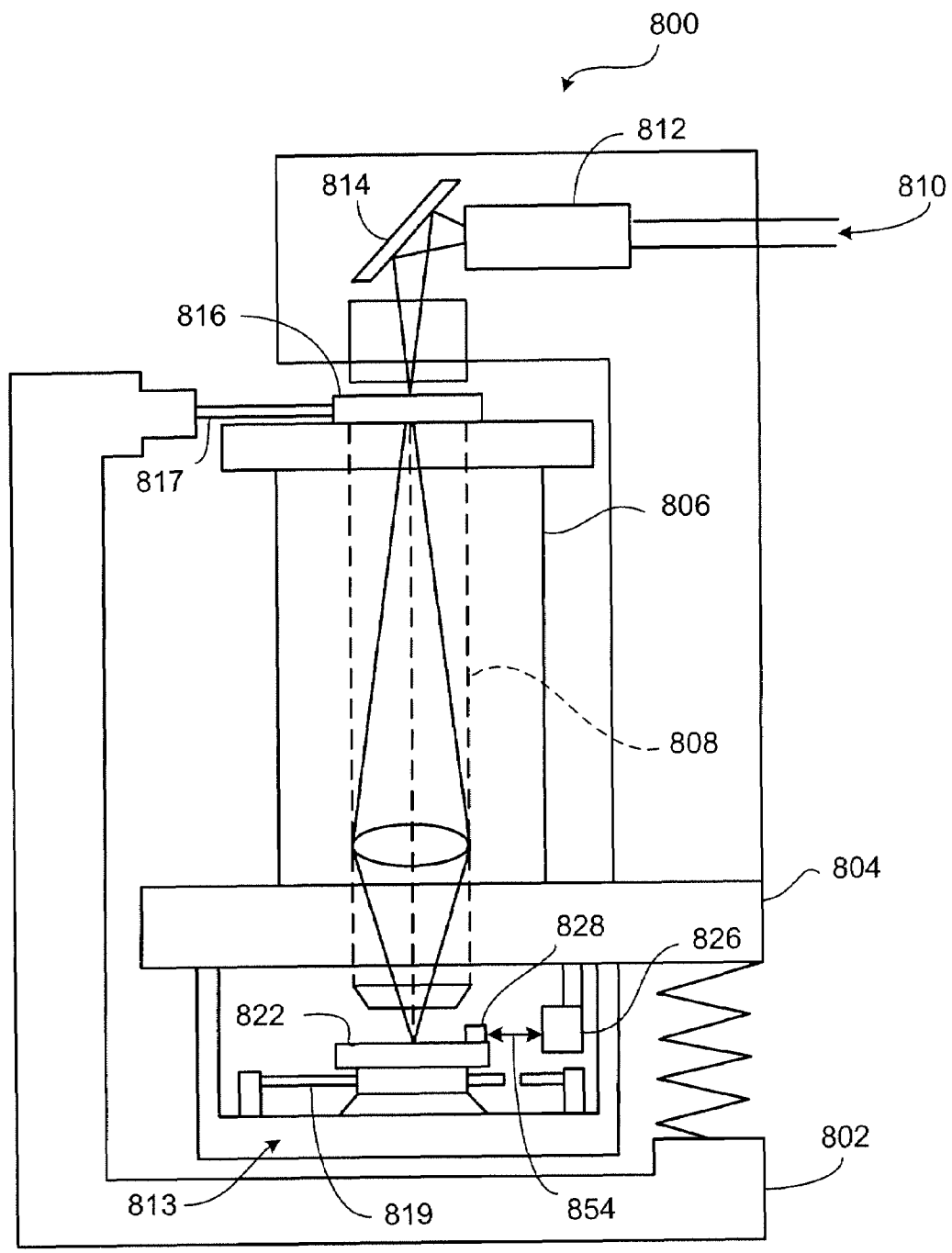
FIG. 8A is a schematic diagram of a lithography system used to make integrated circuits.

An example of a lithography scanner 800 using an interferometry system 826 is shown in FIG. 8a. The interferometry system is used to precisely measure the position of a wafer (not shown) within an exposure system. Here, stage 822 is used to position and support the wafer relative to an exposure station. Scanner 800 includes a frame 802, which carries other support structures and various components carried on those structures. An exposure base 804 has mounted on top of it a lens housing 806 atop of which is mounted a reticle or mask stage 816, which is used to support a reticle or mask. A positioning system for positioning the mask relative to the exposure station is indicated schematically by element 817. Positioning system 817 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith Microlithography: Science and Technology).

Suspended below exposure base 804 is a support base 813 that carries wafer stage 822. Stage 822 includes a plane mirror 828 for reflecting a measurement beam 854 directed to the stage by interferometry system 826. A positioning system for positioning stage 822 relative to interferometry system 826 is indicated schematically by element 819. Positioning system 819 can include, e.g., piezoelectric transducer elements and corresponding control electronics. The measurement beam reflects back to the interferometry system, which is mounted on exposure base 804. The interferometry system can be any of the embodiments described previously.

During operation, a radiation beam 810, e.g., an ultraviolet (UV) beam from a UV laser (not shown), passes through a beam shaping optics assembly 812 and travels downward after reflecting from mirror 814. Thereafter, the radiation beam passes through a mask (not shown) carried by mask stage 816. The mask (not shown) is imaged onto a wafer (not shown) on wafer stage 822 via a lens assembly 808 carried in a lens housing 806. Base 804 and the various components supported by it are isolated from environmental vibrations by a damping system depicted by spring 820.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 826 directs the reference beam (not shown) along an external reference path that contacts a reference mirror (not shown) mounted on some structure that directs the radiation beam, e.g., lens housing 806. The reference mirror reflects the reference beam back to the interferometry system. The interference signal produce by interferometry system 826 when combining measurement beam 854 reflected from stage 822 and the reference beam reflected from a reference mirror mounted on the lens housing 806 indicates changes in the position of the stage relative to the radiation beam. Furthermore, in other embodiments the interferometry system 826 can be positioned to measure changes in the position of reticle (or mask) stage 816 or other movable components of the scanner system. Finally, the interferometry systems can be used in a similar fashion with lithography systems involving steppers, in addition to, or rather than, scanners.

Figure 8B:
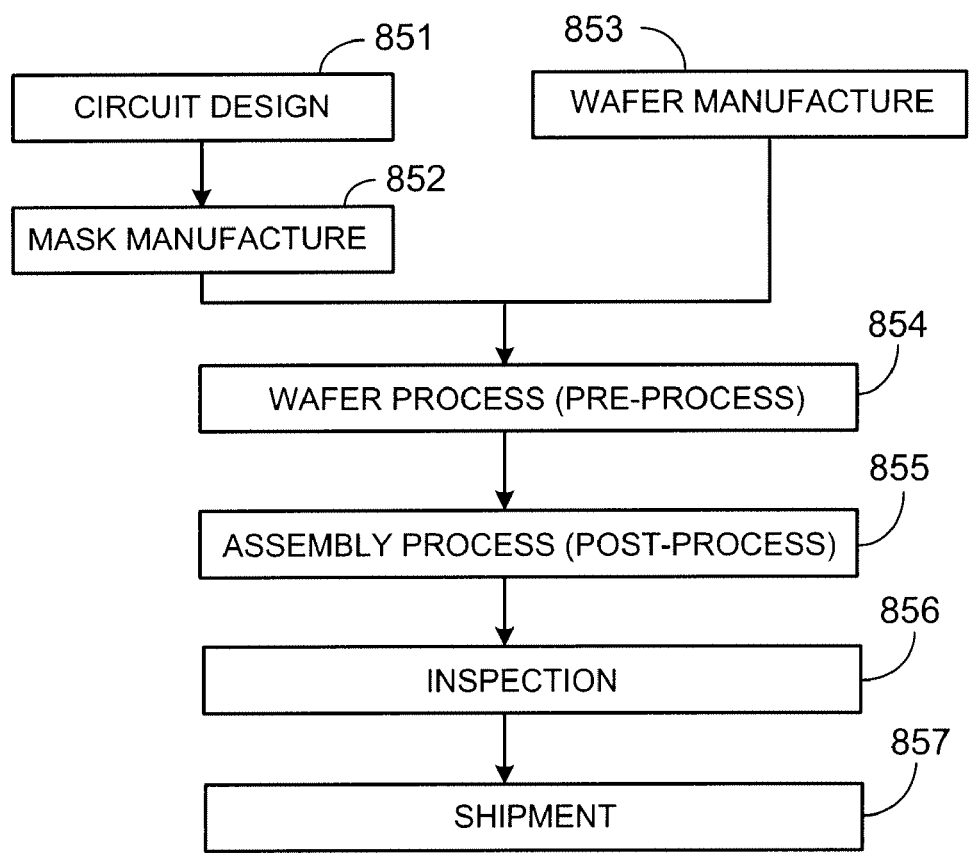
FIGS. 8B and 8C are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 8b and 8c. FIG. 8b is a flow chart of the sequence of manufacturing a semiconductor device such as a semiconductor chip (e.g. IC or LSI), a liquid crystal panel or a CCD. Step 851 is a design process for designing the circuit of a semiconductor device. Step 852 is a process for manufacturing a mask on the basis of the circuit pattern design. Step 853 is a process for manufacturing a wafer by using a material such as silicon.

Step 854 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 855 is an assembling step, which is called a post-process wherein the wafer processed by step 854 is formed into semiconductor chips. This step includes assembling (dicing and bonding) and packaging (chip sealing). Step 856 is an inspection step wherein operability check, durability check and so on of the semiconductor devices produced by step 855 are carried out. With these processes, semiconductor devices are finished and they are shipped (step 857).

Figure 8C:
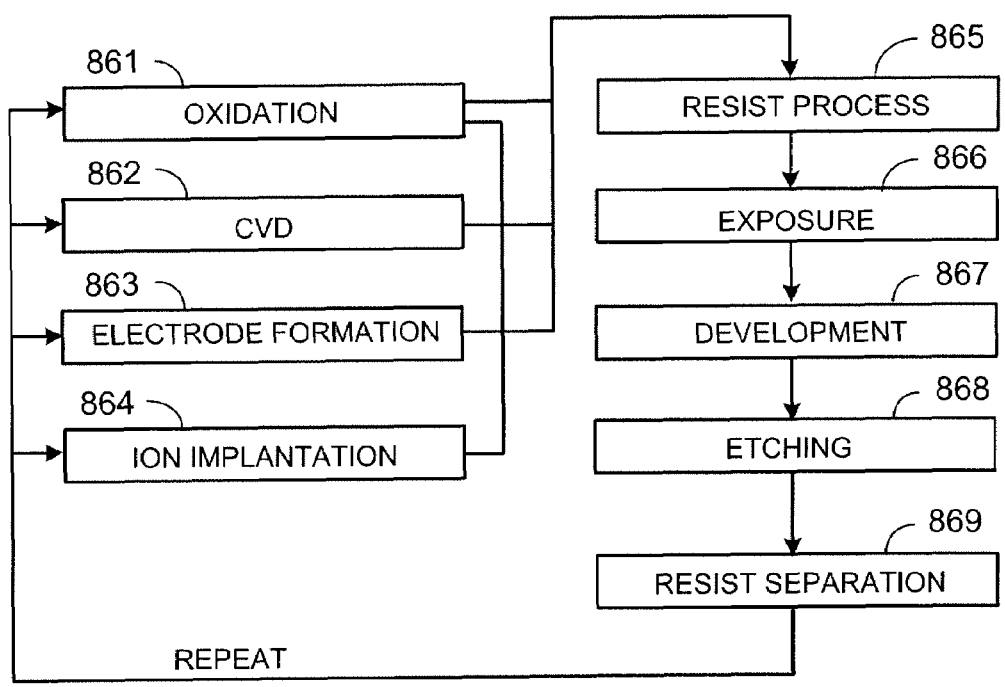

FIG. 8c is a flow chart showing details of the wafer process. Step 861 is an oxidation process for oxidizing the surface of a wafer. Step 862 is a CVD process for forming an insulating film on the wafer surface. Step 863 is an electrode forming process for forming electrodes on the wafer by vapor deposition. Step 864 is an ion implanting process for implanting ions to the wafer. Step 865 is a resist process for applying a resist (photosensitive material) to the wafer. Step 866 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 867 is a developing process for developing the exposed wafer. Step 868 is an etching process for removing portions other than the developed resist image. Step 869 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 9:
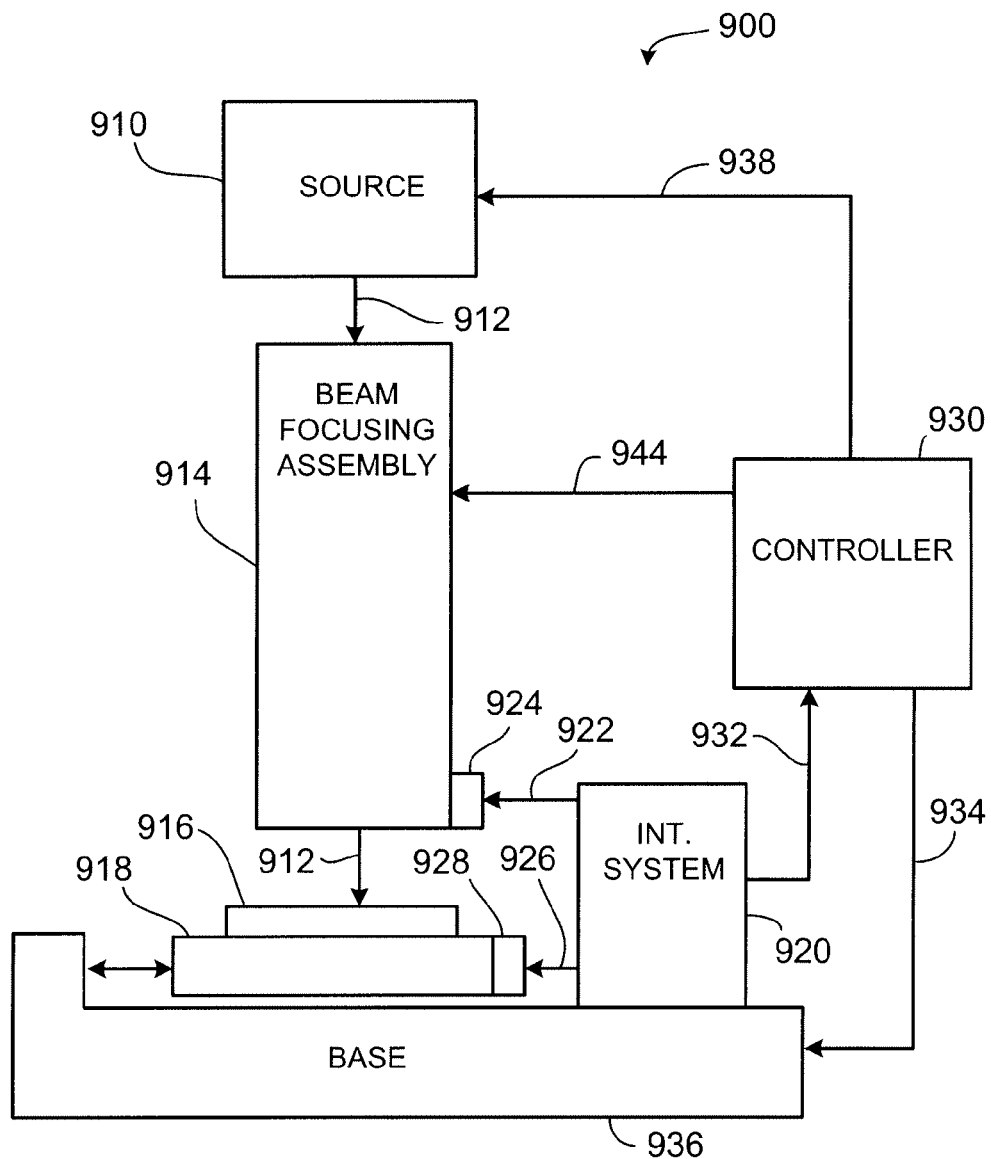
FIG. 9 is a schematic of a beam writing system.

As an example, a schematic of a beam writing system 900 is shown in FIG. 9. A source 910 generates a write beam 912, and a beam focusing assembly 914 directs the radiation beam to a substrate 916 supported by a movable stage 918. To determine the relative position of the stage, an interferometry system 920 directs a reference beam 922 to a mirror 924 mounted on beam focusing assembly 914 and a measurement beam 926 to a mirror 928 mounted on stage 918. Since the reference beam contacts a mirror mounted on the beam focusing assembly, the beam writing system is an example of a system that uses a column reference. Interferometry system 920 can be any of the interferometry systems described previously. Changes in the position measured by the interferometry system correspond to changes in the relative position of write beam 912 on substrate 916.

Interferometry system 920 sends a measurement signal 932 to controller 930 that is indicative of the relative position of write beam 912 on substrate 916. Controller 930 sends an output signal 934 to a base 936 that supports and positions stage 918. In addition, controller 930 sends a signal 938 to source 910 to vary the intensity of, or block, write beam 912 so that the write beam contacts the substrate with an intensity sufficient to cause photophysical or photochemical change only at selected positions of the substrate.

Furthermore, in some embodiments, controller 930 can cause beam focusing assembly 914 to scan the write beam over a region of the substrate, e.g., using signal 944. As a result, controller 930 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrupole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

Figure 13:
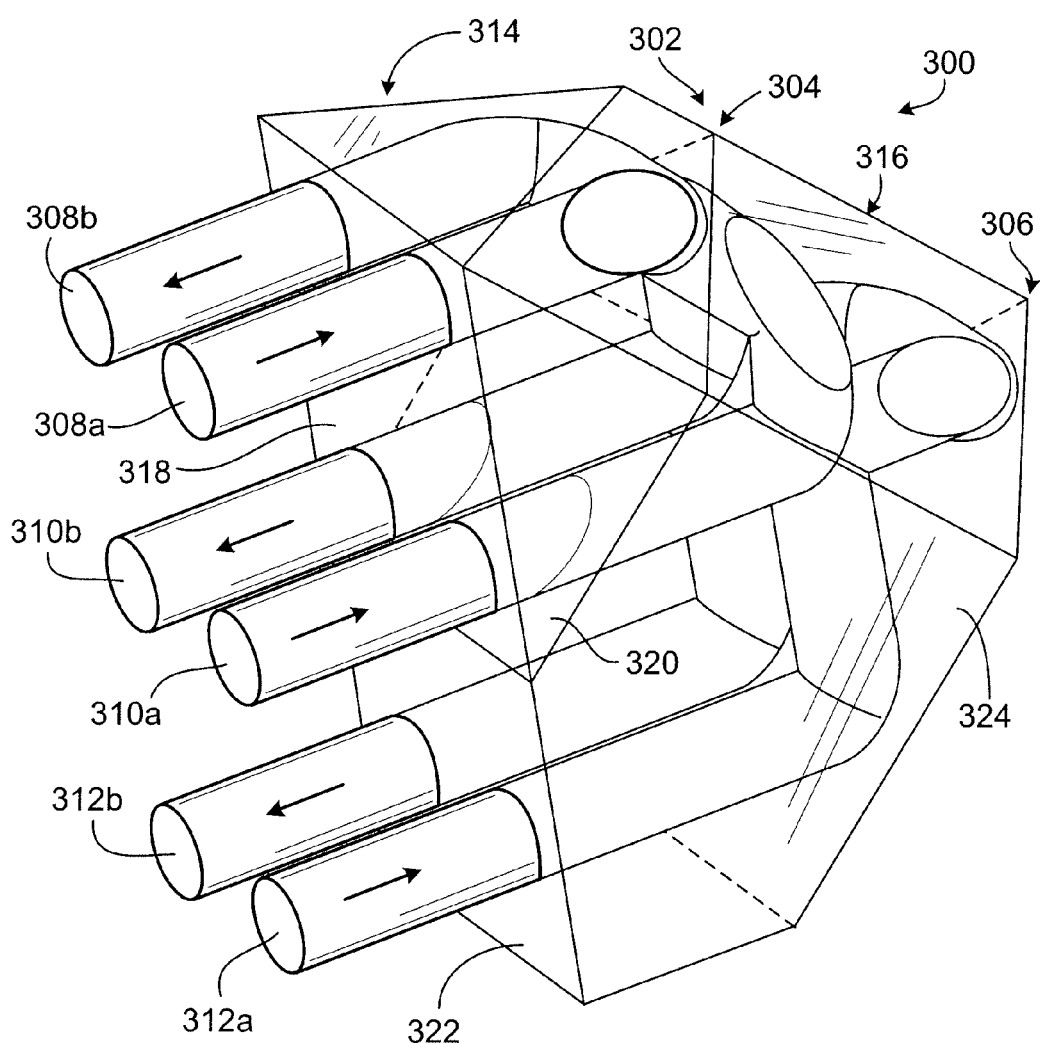
FIGS. 13-16 each shows a three-corner retroreflector that retro-reflects parallel input beams.
Figure 14:
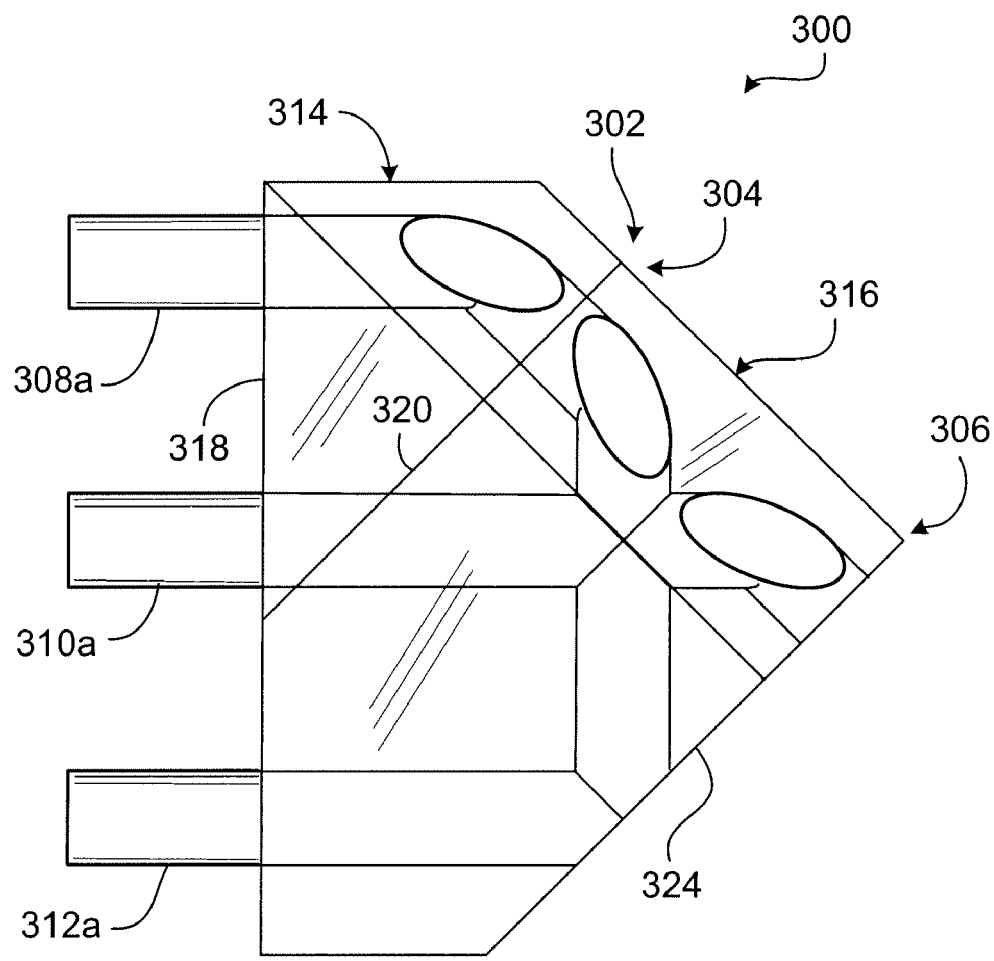
Figure 15:
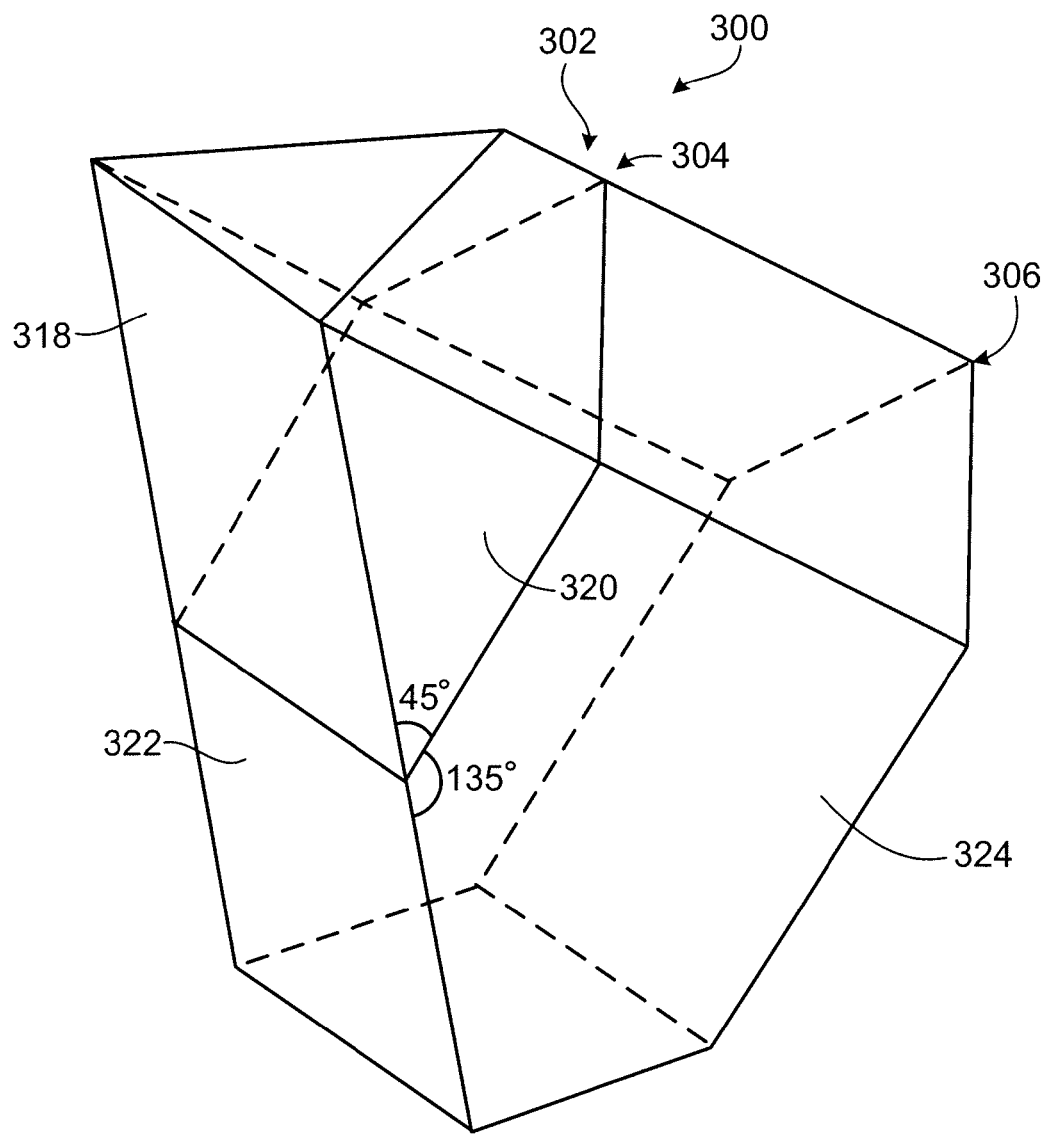

FIG. 13 shows an example of a three-corner retroreflector 300 that retro-reflects an upper input beam 308a, a middle input beam 310a, and a lower input beam 312a to generate an upper output beam 308b, a middle output beam 310b, and a lower output beam 312b, respectively. FIG. 14 shows a side view of the three-corner retroreflector 300 and the input beams. FIG. 15 shows the three-corner retroreflector 300 without the light beams, and FIG. 16 shows an exploded view of the three-corner retroreflector 300.

Figure 16:
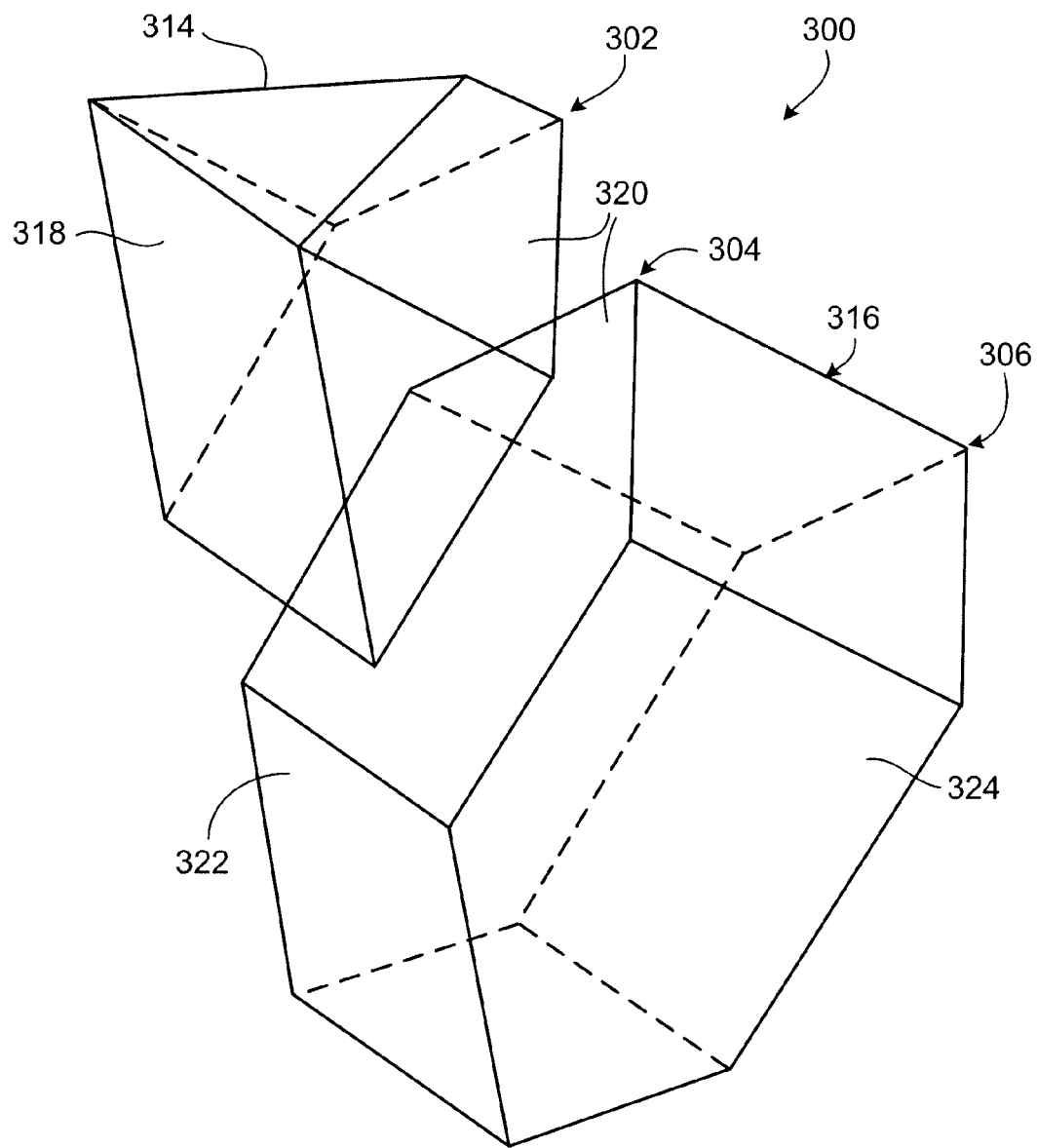

Referring to FIGS. 15 and 16, the three-corner retroreflector 300 is made by optically contacting a one-corner retroreflector 314 and a two-corner retroreflector 316. The one-corner retroreflector 312 has a cube corner 302, and the two-corner retroreflector 314 has two cube corners 304 and 306.

Referring to FIGS. 13 and 14, the upper input beam 308a enters the three-corner retroreflector 300 through a face 318 of the one-corner retroreflector 314, and is retro-reflected by the cube corner 302. The middle input beam 312a enters the three-corner retroreflector 300 through the face 318, passes an interface 320 between the one-corner retroreflector 314 and the two-corner retroreflector 316, and is retro-reflected by the cube corner 306. The lower input beam 310a enters the three-corner retroreflector 300 through a face 322, is redirected by a reflecting face 324 towards the cube corner 304, and is retro-reflected by the cube corner 304.

A portion of the interface 320, where the middle input beam 310a passes, has an index matching adhesive to bond the retroreflectors 314 and 316. A portion of the interface 320, where the upper input beam 308a and the lower input beam 312a are reflected, is coated with an opaque layer so that there is no cross-talk between the upper input beam 308a and the lower input beam 312a.

FIG. 15 shows an example in which the faces 318 and 322 are on the same plane. The faces 318 and 322 can also be on different planes, which do not necessarily have to be parallel to each other. The face 318 is at a 45° angle with respect to the interface 320. The face 322 is at a 135° angle with respect to the interface 320. The interface 320 is parallel to the reflecting face 324. Each of the cube corners 302, 304, and 306 is formed by three faces that intersect at right angles.

Figure 17:
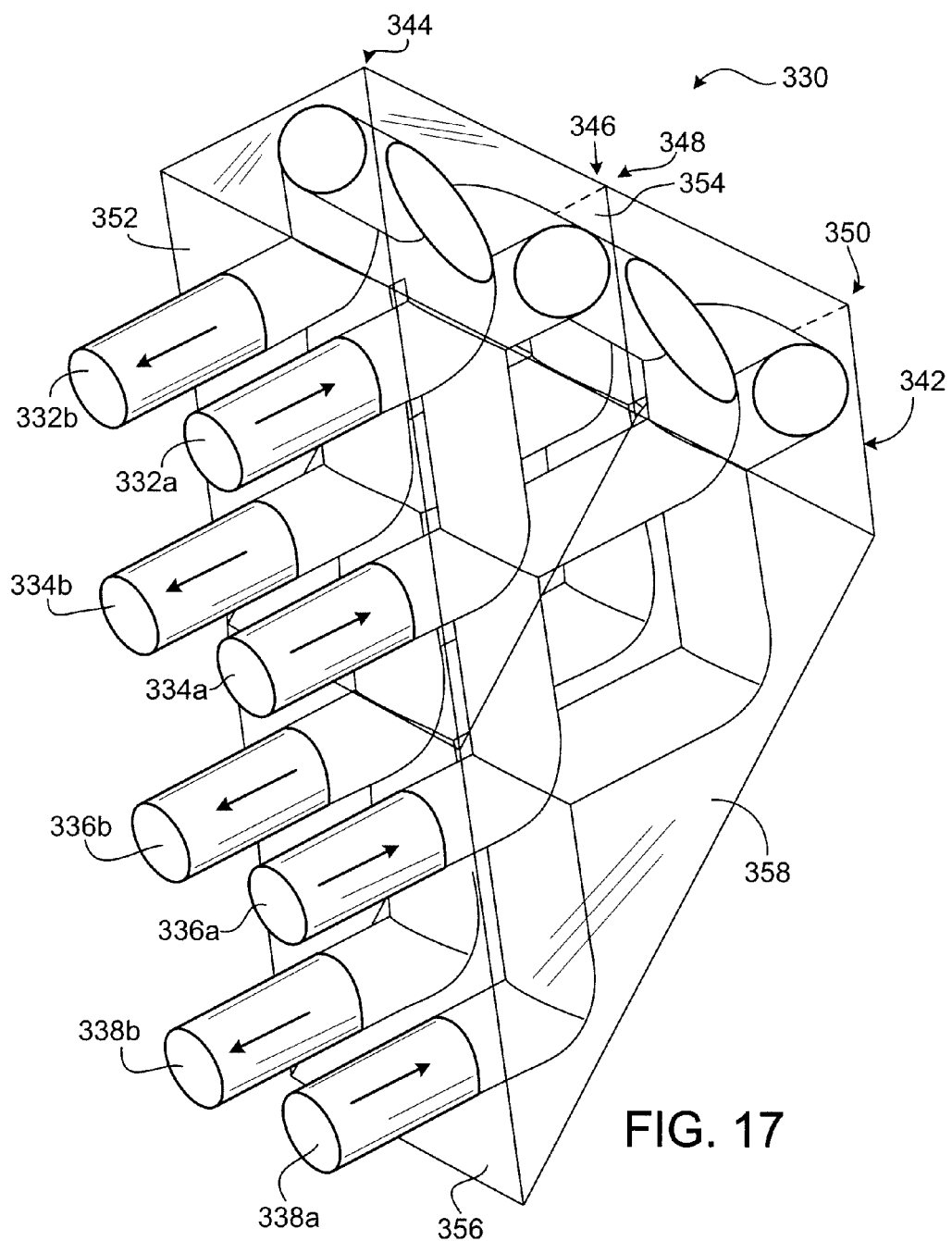
FIGS. 17-20 each shows a four-corner retroreflector that retro-reflects parallel input beams.
Figure 18:
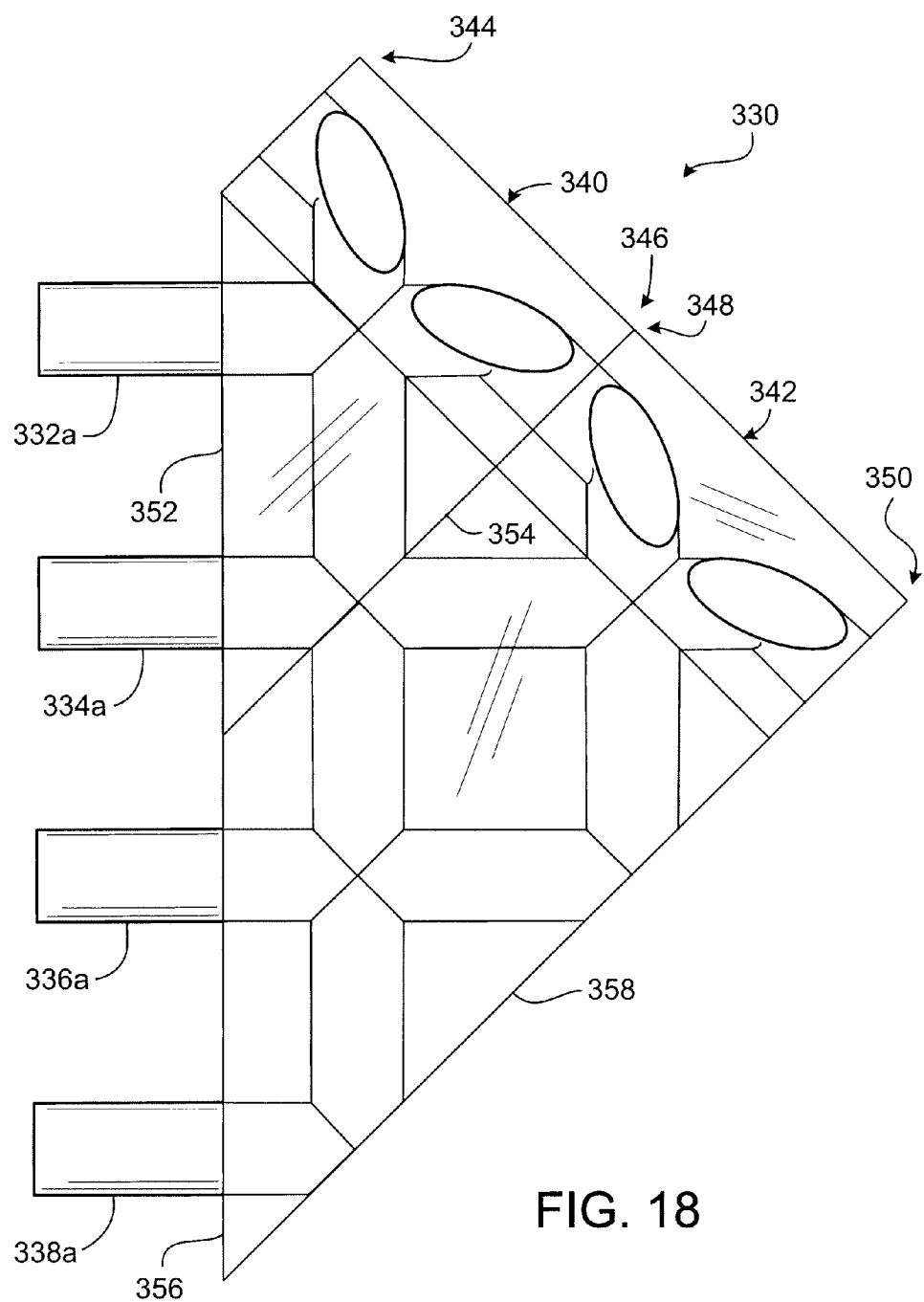
Figure 19:
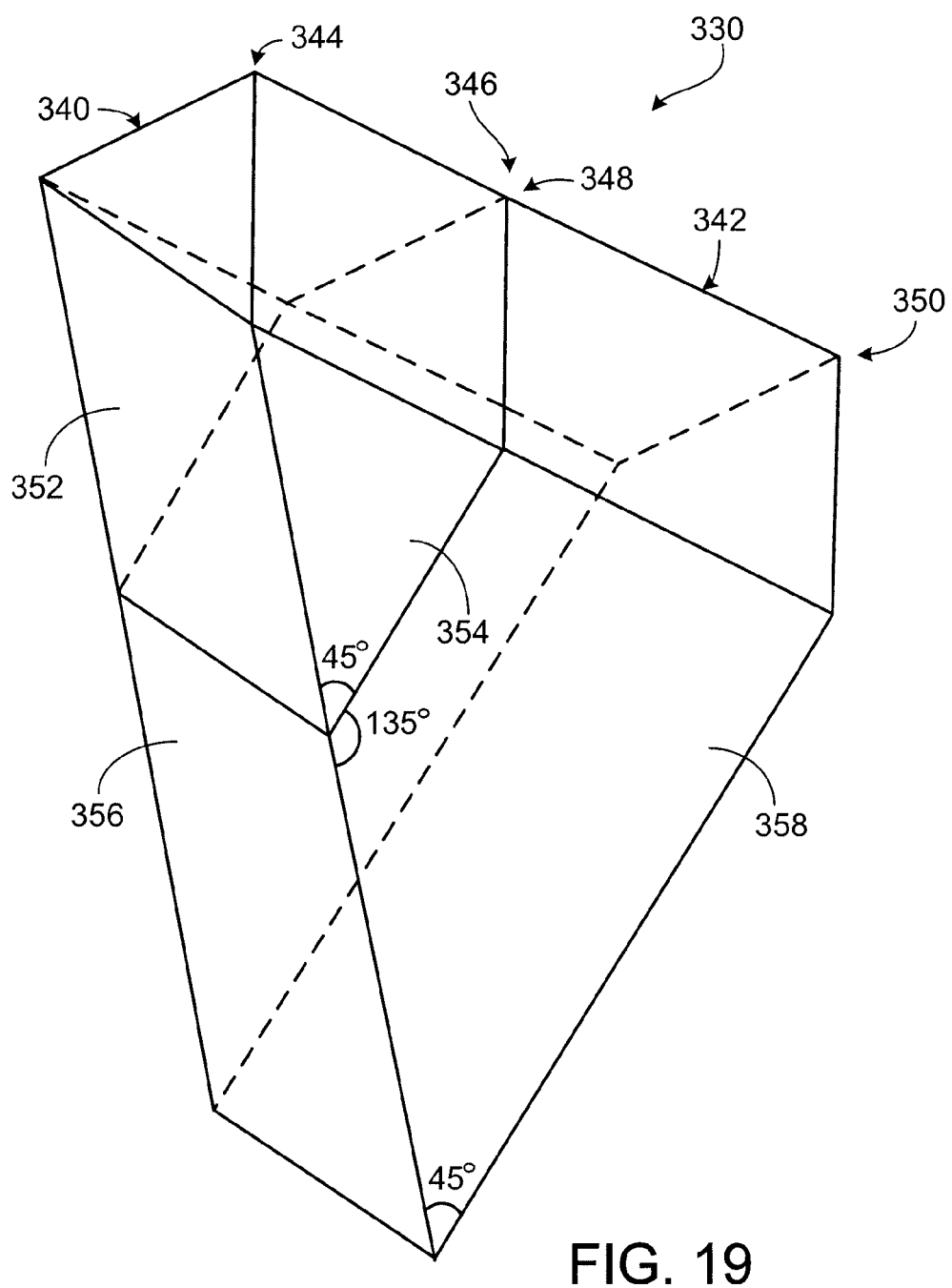

FIG. 17 shows an example of a four-corner retroreflector 330 that retro-reflects a first input beam 332a, a second input beam 334a, a third input beam 336a, and a fourth input beam 338a to generate a first output beam 332b, a second output beam 334b, a third output beam 336b, and a fourth output beam 338b, respectively. FIG. 18 shows a side view of the four-corner retroreflector 330 and the input beams. FIG. 19 shows the four-corner retroreflector 330 without the light beams, and FIG. 20 shows an exploded view of the four-corner retroreflector 330.

Figure 20:
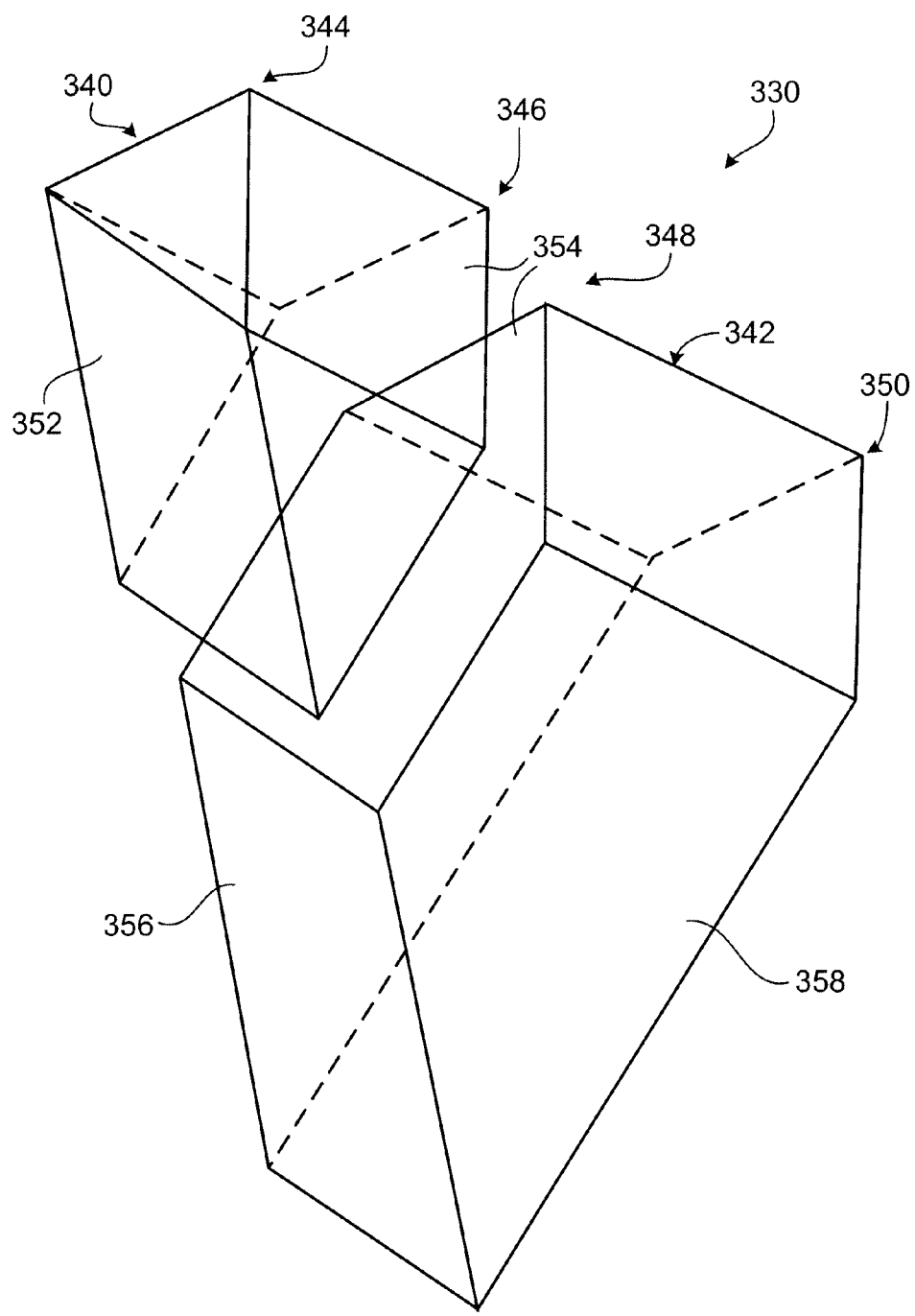

Referring to FIGS. 19 and 20, the four-corner retroreflector 330 is made by optically contacting a two-corner retroreflector 340 and a two-corner retroreflector 342. The two-corner retroreflector 340 has two cube corners 344 and 346. The two-corner retroreflector 342 has two cube corners 348 and 350.

Referring to FIGS. 17 and 18, the first input beam 332a enters the four-corner retroreflector 330 through a face 352 of the two-corner retroreflector 314, and is retro-reflected by the cube corner 346. The second input beam 334a enters the four-corner retroreflector 330 through the face 352, passes an interface 354 between the two two-corner retroreflectors 340 and 342, and is retro-reflected by the cube corner 350. The third input beam 336a enters the four-corner retroreflector 330 through a face 356, is redirected by a reflecting face 358 towards the cube corner 348, and is retro-reflected by the cube corner 348. The fourth input beam 338a enters the four-corner retroreflector 330 through the face 356, is redirected by the reflecting face 358 towards the cube corner 344, passes the interface 354, and is retro-reflected by the cube corner 344.

A portion of the interface 354, where the second input beam 334a and the fourth input beam 338a pass, has an index matching adhesive to bond the retroreflectors 340 and 342. A portion of the interface 354, where the first input beam 332a and the third input beam 336a are reflected, is coated with an opaque layer so that there is no cross-talk between the first input beam 332a and the third input beam 336a.

FIG. 19 shows an example in which the faces 352 and 356 are on the same plane. The faces 352 and 356 can also be on different planes, which do not necessarily have to be parallel to each other. The face 352 is at a 45° angle with respect to the interface 354. The face 356 is at a 135° angle with respect to the interface 354. The interface 354 is parallel to the reflecting face 358. Each of the cube corners 344, 346, 348, and 350 is formed by three faces that intersect at right angles.

The multi-corner retroreflectors (e.g., 300 and 330) can be used in multi-axis interferometers, in which multiple beams are used to provide information about changes in the positions and orientations of one or more measurement objects along different degrees of freedom.

An advantage of the multi-corner retroreflectors (e.g., 300 and 330) is that the distances between the apexes of the cube corners can be precisely defined when the retroreflector is fabricated, and the distances will not change when the retroreflector is mounted to other components of an optical system. The multiple cube corners of the multi-corner retroreflector can be conveniently integrated with other components of the optical system. When the position and orientation of a multi-corner retroreflector are adjusted, the positions and orientations of its cube corners are adjusted at the same time. Less effort is required to align the cube corners of the multi-corner retroreflector, as compared to aligning multiple individual corner cube retroreflectors. The cube corners of the multi-corner retroreflector share faces so that the fabrication cost of the multi-corner retroreflector is less than the cost of fabricating multiple individual corner cube retroreflectors.

Figure 21:
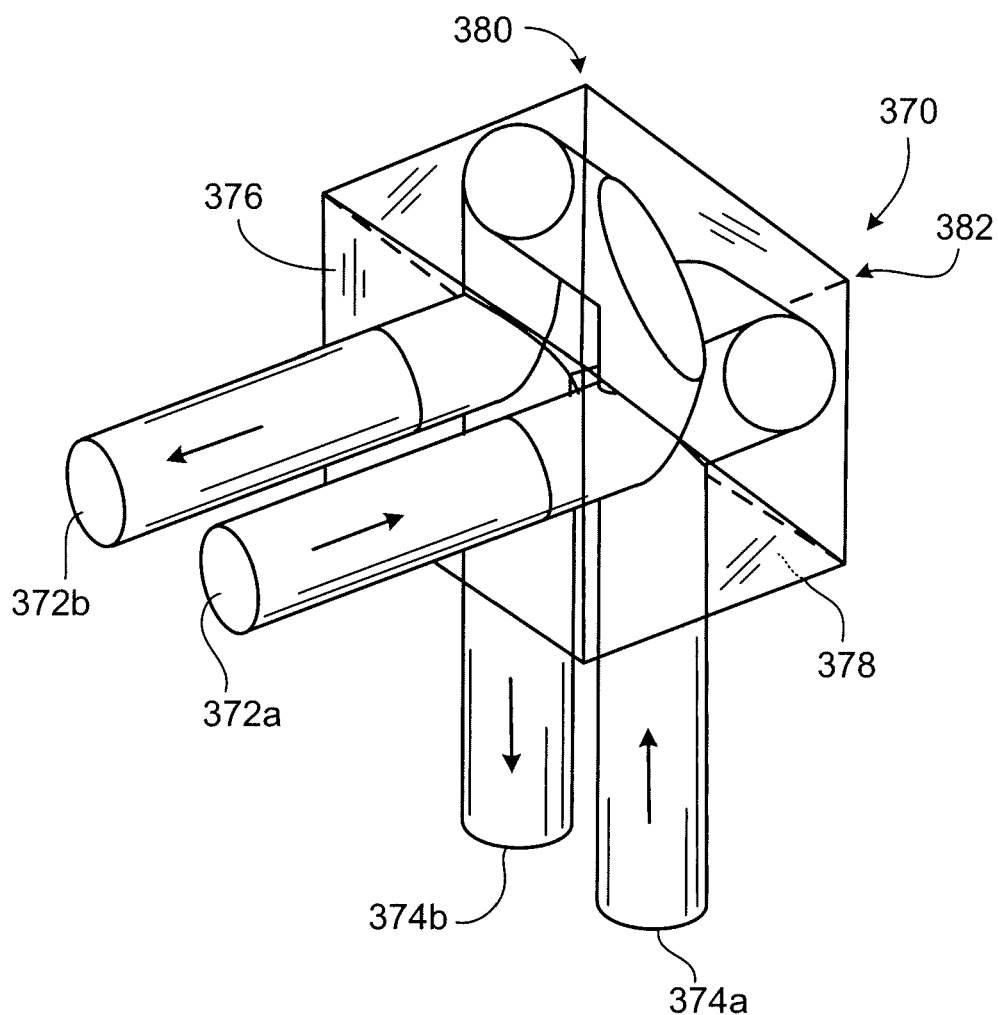
FIGS. 21-25 each shows a four-corner retroreflector that retro-reflects input beams that are not parallel to one another.

FIG. 21 shows an example of a four-corner retroreflector 370 that retro-reflects two input beams that are orthogonal to each other. A first input beam 372a enters the two-corner retroreflector 370 through a face 376 and is retro-reflected by a cube corner 382 to generate an output beam 372b. A second input beam 374a enters the four-corner retroreflector 370 through a face 378 and is retro-reflected by a cube corner 380 to generate an output beam 374b. The faces 376 and 378 intersect at right angles.

Figure 22:
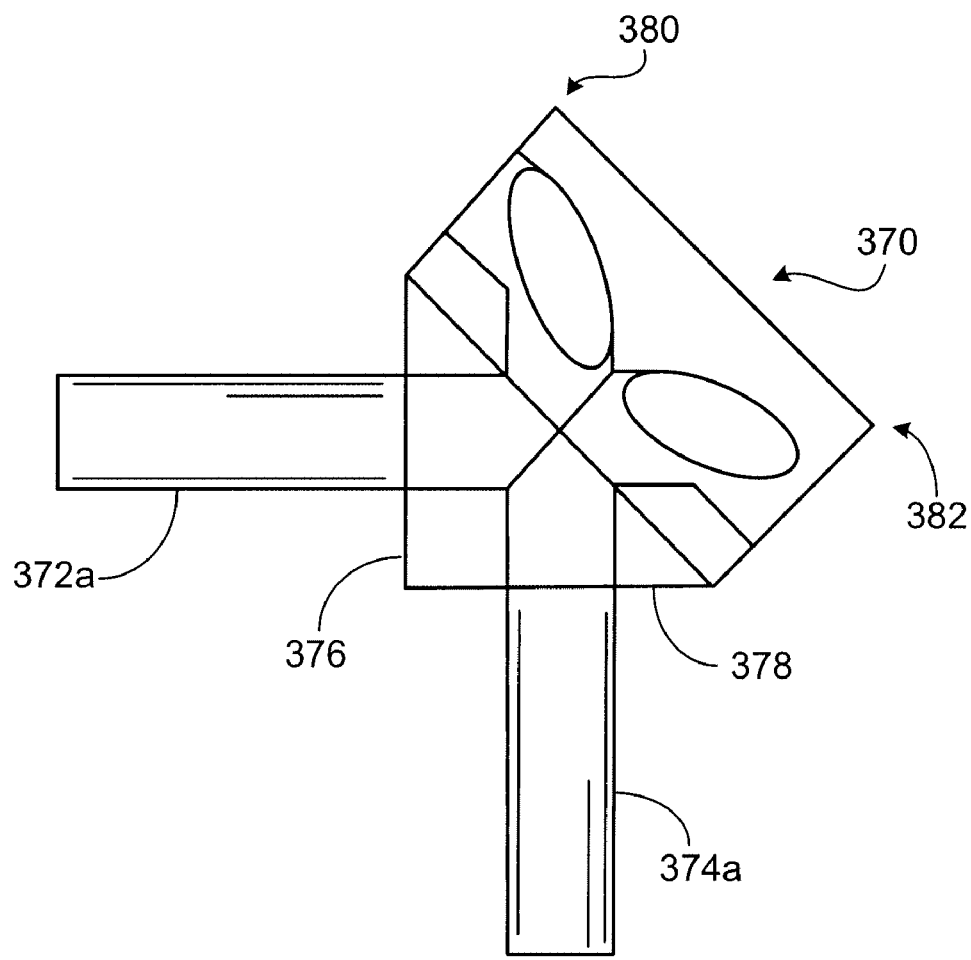
Figure 23:
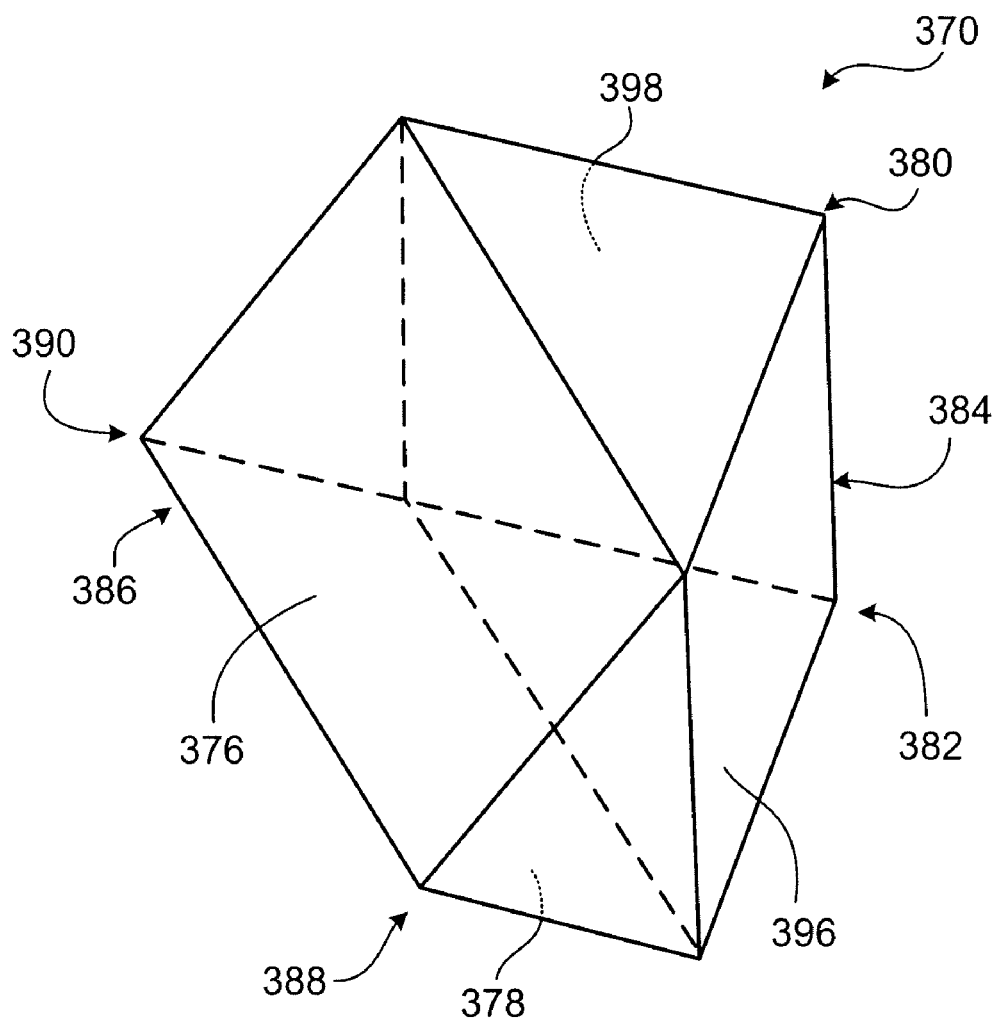
Figure 24:
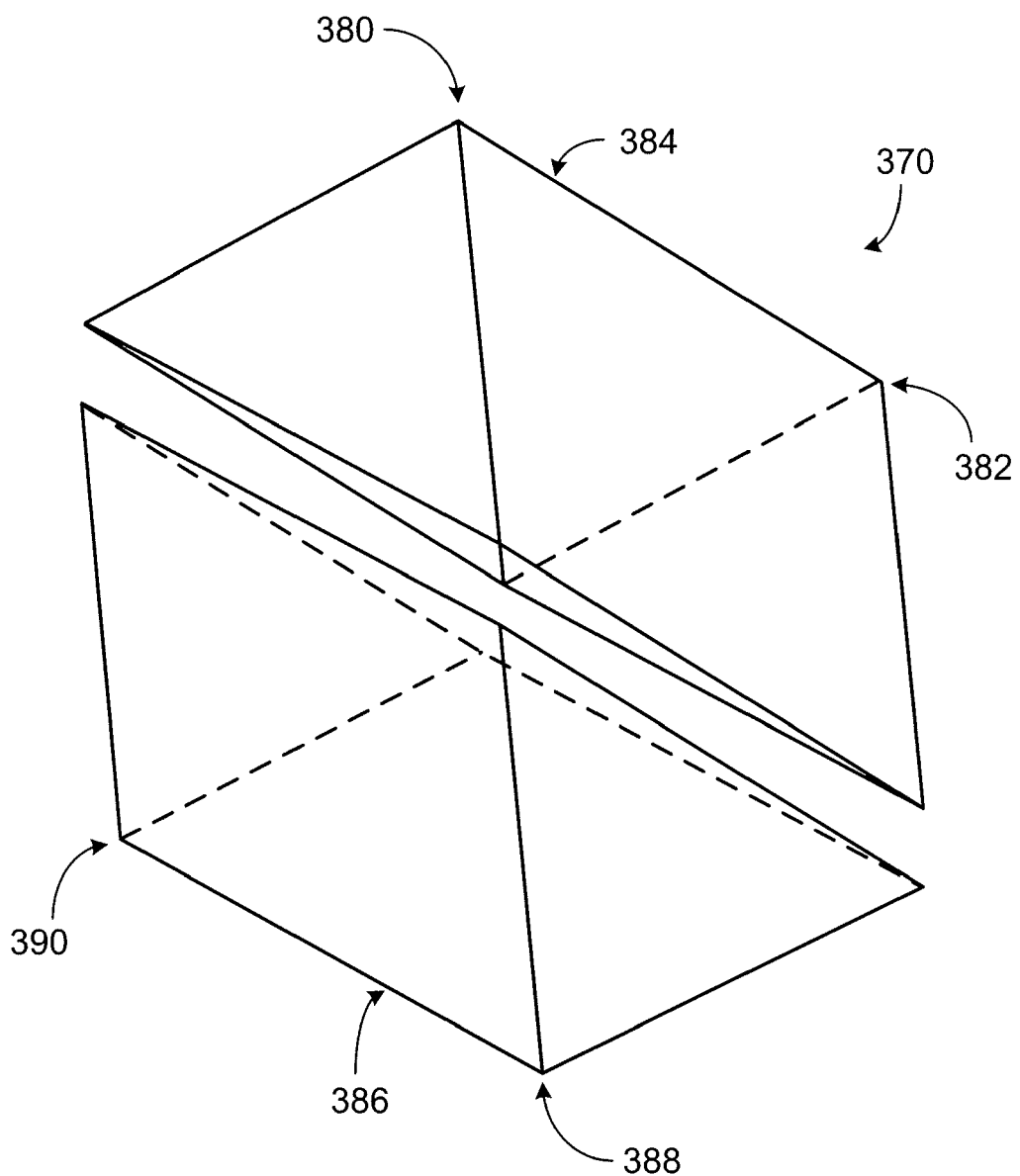

FIG. 22 shows a side view of the two-corner retroreflector 370 and the input beams. FIG. 23 shows a perspective view of the two-corner retroreflector 370. FIG. 24 shows an exploded view of the two-corner retroreflector 370. Referring to FIG. 24, the two-corner retroreflector 370 is formed by two right angle prisms 384 and 386, in which the hypotenuse faces of two prisms optically contact each other. The two prisms are securely held together by, e.g., an index matching adhesive or silicate bonding. The right angle prism 384 includes cube corners 380 and 382. The right angle prism 386 includes cube corners 388 and 390, which are not used in the example shown in FIG. 21.

Figure 25:
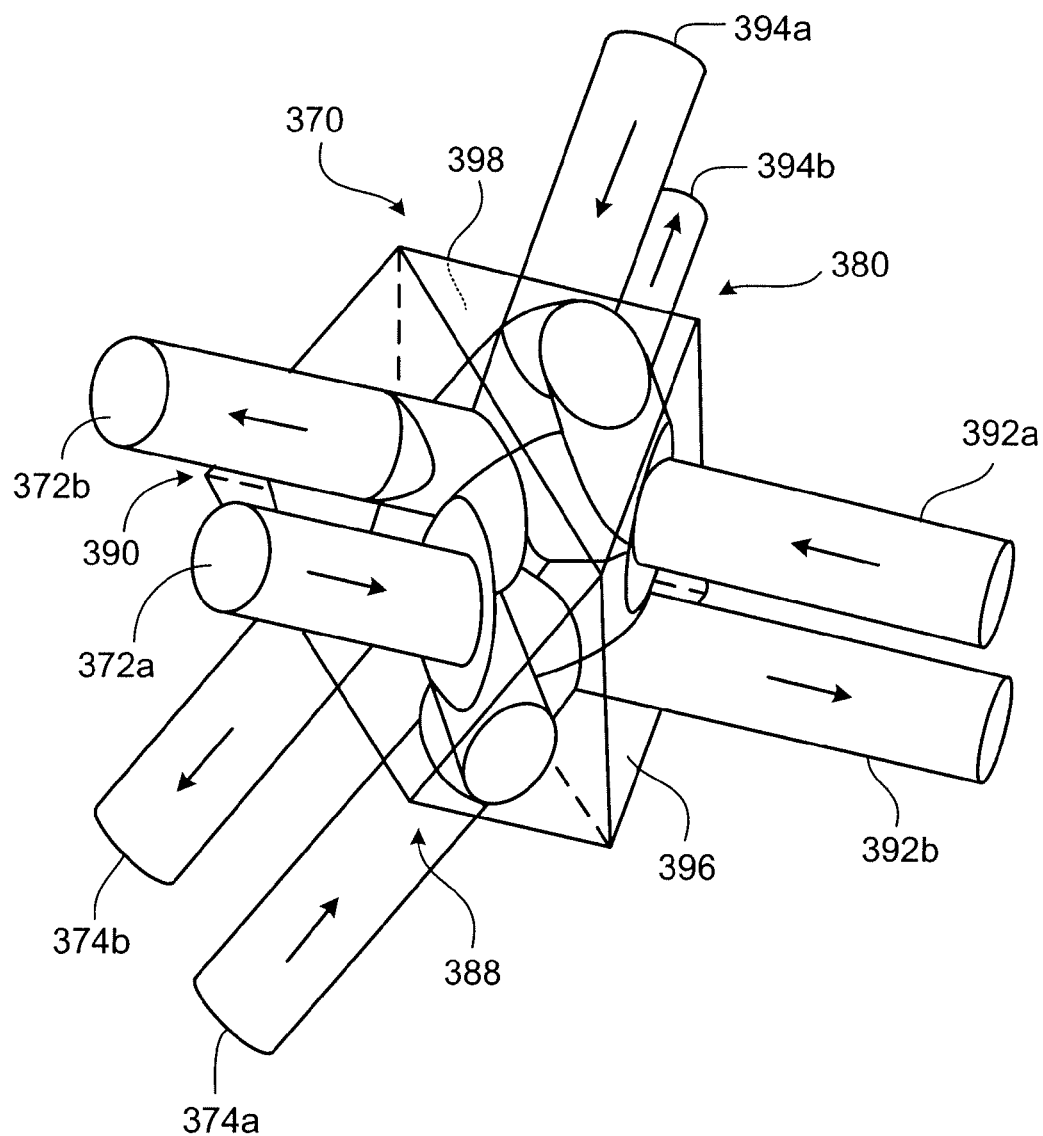

The cube corners 388 and 390 can be used to retro-reflect beams so that the two-corner retroreflector 370 becomes a four-corner retroreflector 370. FIG. 25 shows the four-corner retroreflector 370 retro-reflecting four input beams 372a, 374a, 392a, and 394a. Beam 372a is orthogonal to beam 374a, and beam 392a is orthogonal to beam 394a. The input beam 392a enters the four-corner retroreflector 370 through a face 396 and is retro-reflected by the cube corner 390 to generate an output beam 392b. The input beam 394a enters the four-corner retroreflector 370 through a face 398 and is retro-reflected by the cube corner 388 to generate an output beam 394b.

Although some implementations have been described above, other embodiments are also within the scope of the following claims. For example, the multi-corner retroreflectors may be fabricated using a material other than glass, such as an optical grade plastic. The material (e.g., glass or plastic) may be doped with impurities to achieve certain optical characteristics. The faces of the multi-corner retroreflector (e.g., the common face and the faces that form the cube corners) may be polished or coated with a material, such as silver. The coating may be configured to, e.g., preserve polarization of the light beams, or to increase the bandwidth of useful wavelength of the beams. The multi-corner retroreflector may be used in interferometers different than that shown in FIG. 7. More than four cube corners may be integrated into a multi-corner retroreflector. The input beams may enter the multi-corner retroreflector through different common faces that face different directions.

Figure 26:
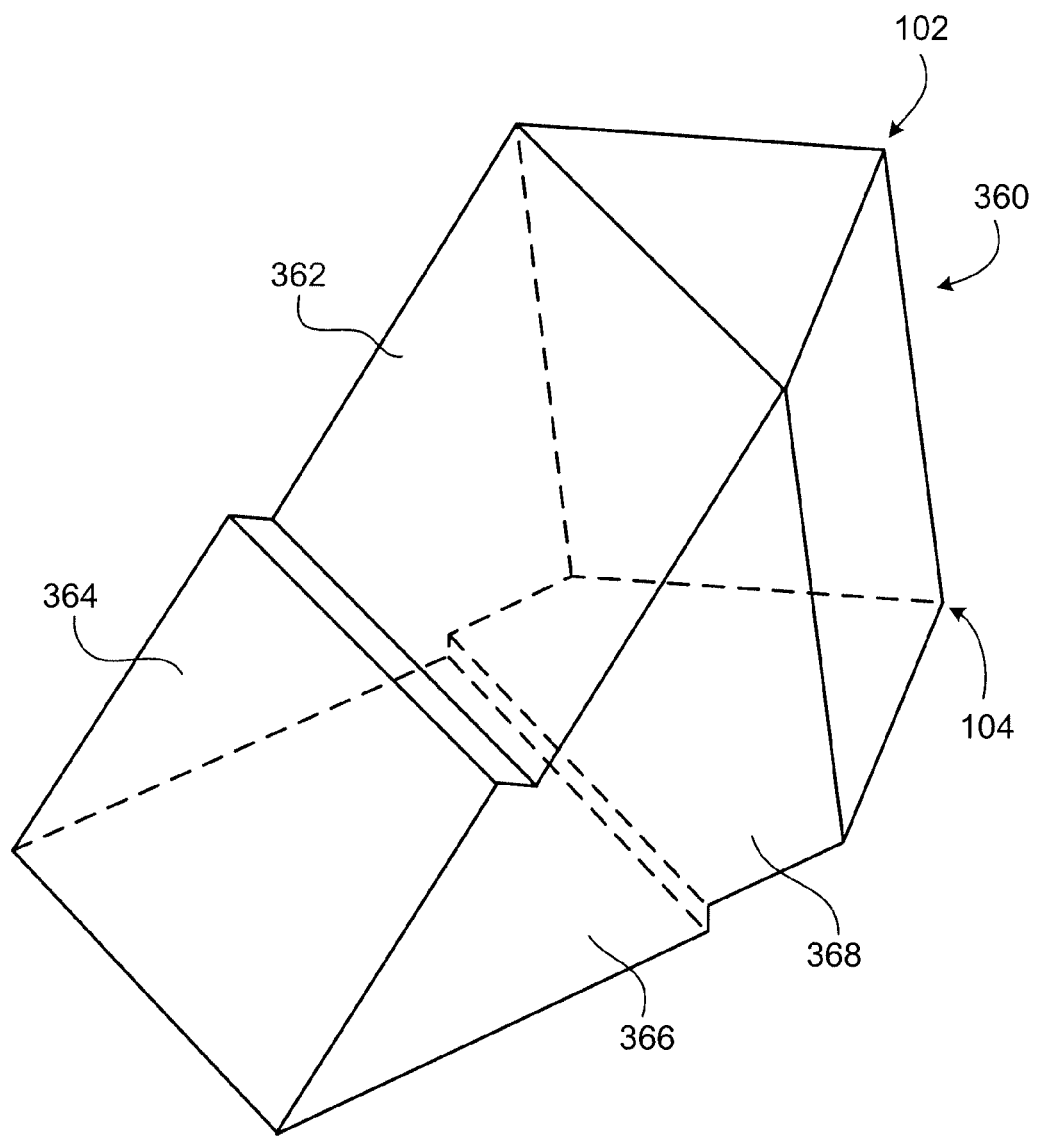
FIG. 26 shows a two-corner retroreflector.

The two-corner retroreflectors 100, 150, 160, 170, and 180 can be modified so that the angle between the common face (e.g., 106) and the reflecting face (e.g., 114 or 138) is different from 45°, as long the angle is within a range that allows the input beams to enter the retroreflector and propagate towards the cube corners. In FIG. 3, the opposing faces 162 and 164 do not necessarily have to be parallel to each other. In FIG. 1, the input beams 108 and 110 may enter the two-corner retroreflector 100 through different faces that are not necessarily parallel to each other. FIG. 26 shows an example of a two-corner retroreflector 360 in which the input beams enter the retroreflector 360 through two faces 362 and 364. The faces 362 and 364 do not have to be parallel to each other. The face (e.g., 366) that redirects the input beam 108 towards the cube corner 102 can be different from the faces (e.g., 368) of the cube corner 104. The face (e.g., 366) that redirects the input beam 108 towards the cube corner 102 does not have to be parallel to any of the three faces forming the cube corner 104.

The two cube corners 102 and 104 do not necessarily have to share any faces, and can be made of different pieces of material, as long as the pieces of material forming the cube corners are rigidly held together so that the positions and orientations of the two cube corners 102 and 104 are adjusted simultaneously.

The three-corner retroreflector 300 can be modified so that the angle between the face 318 and the interface 320 is different from 45°. The angle between the face 322 and the interface 320 can be different from 135°. The one-corner retroreflector 314 does not necessarily have to directly contact the two-corner retroreflector 316. A piece of material (e.g., glass) may be inserted between the retroreflectors 314 and 316, as long as the material allows the middle input beam 310a to propagate towards the lower cube corner 306.

The four-corner retroreflector 330 can be modified so that the angle between the face 352 and the interface 354 is different from 45°. The angle between the face 356 and the interface 354 can be different from 135°. The two-corner retroreflector 340 does not necessarily have to directly contact the two-corner retroreflector 342. A piece of material (e.g., glass) may be inserted between the retroreflectors 340 and 342, as long as the material allows the second input beam 334a to propagate towards the cube corner 350, and the fourth input beam 338a to propagate towards the cube corner 344.

What is claimed is:

1. Apparatus comprising:
   an optical device comprising a common face positioned to receive two beams, the optical device further comprising a first corner and a second corner each positioned to receive one of the beams and retro-reflect it back through the common face, wherein the first corner has a face that overlaps a face of the second corner.

2. The apparatus of claim 1, wherein the optical device further comprises a reflecting face positioned to direct one of the beams from the common face to one of the corners.

3. The apparatus of claim 2, wherein the reflecting face overlaps one of the faces of the other corner.

4. The apparatus of claim 1, wherein the optical device is formed by optically contacting two right-angle prisms, a first one of the prisms comprising the two corners.

5. The apparatus of claim 4, wherein the two right-angle prisms are held together by an adhesive.

6. The apparatus of claim 5, wherein the adhesive comprises at least one of UV glue, an index matching epoxy, and an epoxy that is not index matched.

7. The apparatus of claim 4, wherein the two right-angle prisms are held together by using silicate bonding.

8. The apparatus of claim 1, wherein the optical device comprises a single piece of material.

9. The apparatus of claim 8, wherein the material comprises glass.

10. The apparatus of claim 1, wherein a distance between apexes of the two corners is fixed.

11. The apparatus of claim 1, wherein the first corner has two faces that overlap two faces of the second corner.

12. The apparatus of claim 1, wherein the optical device comprises a first piece of material including the first and second corners, and a second piece of material including the common face.

13. The apparatus of claim 12, wherein the first and second pieces of materials contact each other.

14. The apparatus of claim 13, wherein an index matching layer is disposed between the two pieces of materials.

15. The apparatus of claim 1, wherein each corner has three faces, and at least one of the faces of the corners comprises a polished surface.

16. The apparatus of claim 1, wherein each corner has three faces, and at least one of the faces of the corners comprises a silver coating.

17. The apparatus of claim 1, wherein the common face comprises an antireflection coating.

18. The apparatus of claim 1, wherein each corner has three faces, and the first corner has a face that is parallel to a face of the second corner.

19. The apparatus of claim 1, wherein the common face is positioned to receive a third beam, and the optical device further comprises a third corner positioned to receive the third beam and retro-reflect it back through the common face.

20. The apparatus of claim 19, wherein two of the three corners have apexes that are adjacent to each other.

21. The apparatus of claim 19, wherein the three beams are parallel to one another.

22. The apparatus of claim 19, wherein the common face is positioned to receive a fourth beam, and the optical device further comprises a fourth corner positioned to receive the fourth beam and retro-reflect it back through the common face.

23. The apparatus of claim 22, wherein the optical device further comprises a reflecting face positioned to direct a first one of the four beams from the common face to a first one of the corners, and to direct a second one of the four beams from the common face to a second one of the corners.

24. The apparatus of claim 22, wherein the four beams are parallel to one another.

25. An interferometer comprising:
   optics to generate a first measurement beam and a second measurement beam that each contacts a measurement object at least a first time and a second time, and overlap each of the measurement beams with a reference beam to generate an interfering signal; and
   the optical device of claim 1 to redirect each of the first and second measurement beams after the beam contacts the measurement object the first time and before the beam contacts the measurement object the second time.

26. A lithography system for use in fabricating integrated circuits on a wafer, the system comprising:
   a stage for supporting the wafer;
   an illumination system for imaging spatially patterned radiation onto the wafer;
   a positioning system for adjusting the position of the stage relative to the imaged radiation; and
   a multi-axis interferometer for monitoring the position of the wafer relative to the imaged radiation, the multi-axis interferometer comprising the optical device of claim 1 to redirect light beams in the multi-axis interferometer.

27. A lithography system for use in fabricating integrated circuits on a wafer, the system comprising:
   a stage for supporting the wafer; and
   an illumination system comprising a radiation source, a mask, a positioning system, a lens assembly, and a multi-axis interferometry system including the optical device of claim 1,
   wherein during operation the source directs radiation through a mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

28. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
an interferometry system that includes the optical device of claim 1 for monitoring the position of the stage relative to the beam directing assembly.

29. Apparatus comprising:
an optical device comprising
one or more faces to receive at least two input beams in which two of the input beams are substantially orthogonal to each other, and
at least two corners formed by a single piece of material, the corners each positioned to receive one of the input beams and retro-reflect it back through one of the faces.

30. The apparatus of claim 29, wherein the optical device receives three input beams and comprises three corners each positioned to receive and retro-reflect one of the input beams.

31. The apparatus of claim 30, wherein two of the three input beams are substantially parallel to each other.

32. The apparatus of claim 30, wherein two of the three input beams are substantially orthogonal to each other.

33. The apparatus of claim 30, wherein the optical device comprises a one-corner retroreflector that includes one of the three corners and a two-corner retroreflector that includes two of the three corners.

34. The apparatus of claim 29, wherein the optical device receives four input beams and comprises four corners each positioned to receive and retro-reflect one of the input beams.

35. The apparatus of claim 34, wherein the four input beams are substantially parallel to one another.

36. The apparatus of claim 34, wherein the four input beams have a first pair of beams that are substantially orthogonal to each other, and a second pair of beams that are substantially orthogonal to each other.

37. The apparatus of claim 34, wherein the optical device comprises two two-corner retroreflectors each including two of the four corners.

38. An apparatus comprising:
a multi-axis interferometer for measuring a relative position of a reflective measurement object along multiple degrees of freedom, the interferometer having optics to produce multiple output beams each comprising information about the position of the measurement object relative to a reference object with respect to a different one of the degrees of freedom, the optics comprising an optical device that includes a first retroreflector and a second retroreflector each comprising three reflecting surfaces, one of the three reflecting surfaces of the first retroreflector overlapping one of the three reflecting surfaces of the second retroreflector.

39. The apparatus of claim 38, wherein each output beam includes a measurement beam component that contacts the measurement object at least once along a path that is common to at least two output beams.

40. The apparatus of claim 39, wherein at least one of the measurement beam components further contacts the measurement object at least a second time along another path different from the common path.

41. The apparatus of claim 38, wherein the optics comprises a polarizing beam-splitter positioned to direct the measurement beam components to contact the measurement object along the common path.

42. The apparatus of claim 41, wherein the optics comprises a return beam assembly configured to receive the primary measurement beam from the polarizing beam-splitter and direct the multiple beams back to the polarizing beam-splitter using the two retroreflectors.

43. The apparatus of claim 38, wherein the retroreflectors comprise corner cube retroreflectors.

44. The apparatus of claim 43, wherein the corner cube retroreflectors are formed by a single unit of material.

45. An apparatus comprising:
an optical device comprising
a common face to receive two beams that are substantially parallel to each other and spaced apart at a specified distance, and
two corners each positioned to receive one of the beams and retro-reflect it back through the common face, in which the distance between the apexes of the two corners as projected on the common face is substantially equal to the specified distance;
wherein the first corner has a face that overlaps a face of the second corner.

46. The apparatus of claim 45, further comprising a beam splitter to receive an incident beam and generate the first and second beams.

47. The apparatus of claim 45, wherein the two corners comprise polished surfaces of a single piece of material.

48. An interferometer comprising:
the optical device of claim 45; and
optics to overlap each of the two beams that are retro-reflected by the two corners with a reference beam to generate interfering signals.

49. A method comprising:
optically contacting a hypotenuse of a first right-angle prism to a leg of a second right-angle prism to form a two-corner retroreflector.

50. The method of claim 49, further comprising holding the two right-angle prisms together by an adhesive.

51. The method of claim 49, further comprising holding the two right-angle prisms together by at least one of W glue, an index matching epoxy, and an epoxy that is not index matched.

52. The method of claim 49, further comprising holding the two right-angle prisms together by silicate bonding.

53. The method of claim 49, further comprising applying a coating on a face of the right-angle prism.

54. The method of claim 49, further comprising attaching the two-corner retroreflector to a set of optical components that include a beam splitter to form an interferometer.

55. A method comprising:
receiving a first and a second beam at a common face,
propagating the first beam from the common face to a reflecting surface;
reflecting the first beam using the reflecting surface and directing the reflected first beam towards a first corner;
propagating the second beam from the common face to a second corner without being reflected by the reflecting surface,
retro-reflecting the first beam using the first corner; and
retro-reflecting the second beam using the second corner.

56. The method of claim 55, wherein the corners comprise polished surfaces of the material.

57. The method of claim 55, further comprising overlapping each of the first and second light beams with a reference beam to generate interfering signals.

58. The method of claim 57, further comprising determining a change in position and/or orientation of a measurement object relative to a reference object based on the interfering signals.

59. A method comprising:
retro-reflecting a first beam using a first corner; and
retro-reflecting a second beam using a second corner, the first and second beams spaced apart at a specified distance, the apexes of the first and second corners pointing to different directions and being spaced apart at the fixed distance.

60. The method of claim 59, wherein the first corner has two faces that overlap two faces of the second corner.

61. The method of claim 59, further comprising overlapping each of the first and second beams with a reference beam to generate interfering signals.

62. The method of claim 61, further comprising determining a change in position and/or orientation of a measurement object relative to a reference object based on the interfering signals.

63. A method comprising:
interferometrically producing at least two output beams each comprising information about a position of a portion of a measurement object relative to a reference object, in which each output beam includes a beam component that contacts the measurement object at least one time along a common path, and at least one of the beam components further contacts the measurement object at least a second time along a first path different from the common path, in which producing the output beams comprising redirecting the beam components using the method of claim 59.

64. A method comprising:
receiving a first beam and a second beam at a common face of an optical device having a first corner and a second corner;
retro-reflecting the first beam using the first corner; and
retro-reflecting the second beam using the second corner;
wherein the first corner has a face that overlaps a face of the second corner.

65. The method of claim 64, wherein the first corner has two faces that overlap two faces of the second corner.

66. The method of claim 64, further comprising overlapping each of the first and second beams with a reference beam to generate interfering signals.

67. The method of claim 64, further comprising determining a change in position and/or orientation of a measurement object relative to a reference object based on the interfering signals.

68. The method of claim 64, wherein the optical device has a third corner, and the method further comprises receiving a third beam at the common face and retro-reflecting the third beam using the third corner.

69. The method of claim 68, wherein the optical device has a fourth corner, and the method further comprises receiving a fourth beam at the common face and retro-reflecting the fourth beam using the fourth corner.

70. The method of claim 69, further comprising using a reflecting face to direct a first one of the four beams from the common face to a first one of the corners, and to direct a second one of the four beams from the common face to a second one of the corners.

71. A method comprising:
receiving at least two beams at one or more faces of an optical device having at least two corners formed by a single piece of material, the corners each positioned to receive one of the beams and retro-reflect it back through the at least one face;
wherein one of the corners has a face that overlaps a face of another of the corners.

72. The method of claim 71, wherein receiving at least two beams comprises receiving at least three beams at one or more faces of an optical device having at least three corners.

73. The method of claim 71, wherein receiving at least two beams comprises receiving at least four beams at one or more faces of an optical device having at least four corners.

* * * * *